(12) United States Patent
Fratta

(10) Patent No.: US 7,038,345 B2
(45) Date of Patent: May 2, 2006

(54) SYNCHRONOUS ELECTRIC MACHINE

(75) Inventor: Antonino Fratta, Turin (IT)

(73) Assignees: C.R.F. Societa' Consortile per Azioni, Orbassano (IT); Tree di Fratta Antonino S.a.s., Via Levanna (IT)

( * ) Notice: Subject to any disclaimer, the term of this patent is extended or adjusted under 35 U.S.C. 154(b) by 91 days.

(21) Appl. No.: 10/469,521

(22) PCT Filed: Feb. 28, 2002

(86) PCT No.: PCT/EP02/02172

§ 371 (c)(1),
(2), (4) Date: Feb. 20, 2004

(87) PCT Pub. No.: WO02/078151

PCT Pub. Date: Oct. 3, 2002

(65) Prior Publication Data

US 2004/0130231 A1     Jul. 8, 2004

(30) Foreign Application Priority Data

Mar. 2, 2001 (IT) .............................. TOO1A0182

(51) Int. Cl.
*H02K 21/12* (2006.01)
(52) U.S. Cl. .............................. 310/156.53; 310/156.57
(58) Field of Classification Search ........... 310/156.53, 310/153.54, 156.56, 156.57, 156.83, 156.84, 310/162

See application file for complete search history.

(56) References Cited

U.S. PATENT DOCUMENTS

| 4,358,696 | A | * | 11/1982 | Liu et al. | ................ | 310/156.84 |
| 4,476,408 | A | * | 10/1984 | Honsinger | ............. | 310/156.84 |
| 4,924,130 | A | | 5/1990 | Fratta | | |
| 5,818,140 | A | | 10/1998 | Vagati | | |
| 6,008,559 | A | * | 12/1999 | Asano et al. | ........... | 310/156.53 |
| 6,177,745 | B1 | * | 1/2001 | Narita et al. | ........... | 310/156.53 |

FOREIGN PATENT DOCUMENTS

| EP | 0 872 944 A1 | 10/1998 |
| JP | 2000 197 292 A | 7/2000 |

* cited by examiner

Primary Examiner—Dang Le
(74) Attorney, Agent, or Firm—Sughrue Mion, PLLC

(57) ABSTRACT

An electric machine (M) comprises a field (A) and an armature (B) between which is defined an air gap (G). The field (A) has at least one pair of poles (N, S) and the armature (B) has n teeth (20) and n slots (21) per pair of poles (N, S) of the field (A). The surface of the field (A) facing the air gap (G) is divided into 2n elements or samples (1–12) having the same extent along the direction of relative displacement between armature and field, and having a respective magnetic potential value ($\tau_i$). Each sample (1–12) of the field (A) has a respective total permeance value (pi) at the air gap (G) in a predetermined relative position between armature (B) and field (A). The field (A) comprises a plurality of magnetically distinct ferromagnetic bodies (30, 31, 32, . . . ) each of which couples at least two samples of the field in such a way as to ensure a substantial magnetic equipotentiality.

35 Claims, 18 Drawing Sheets

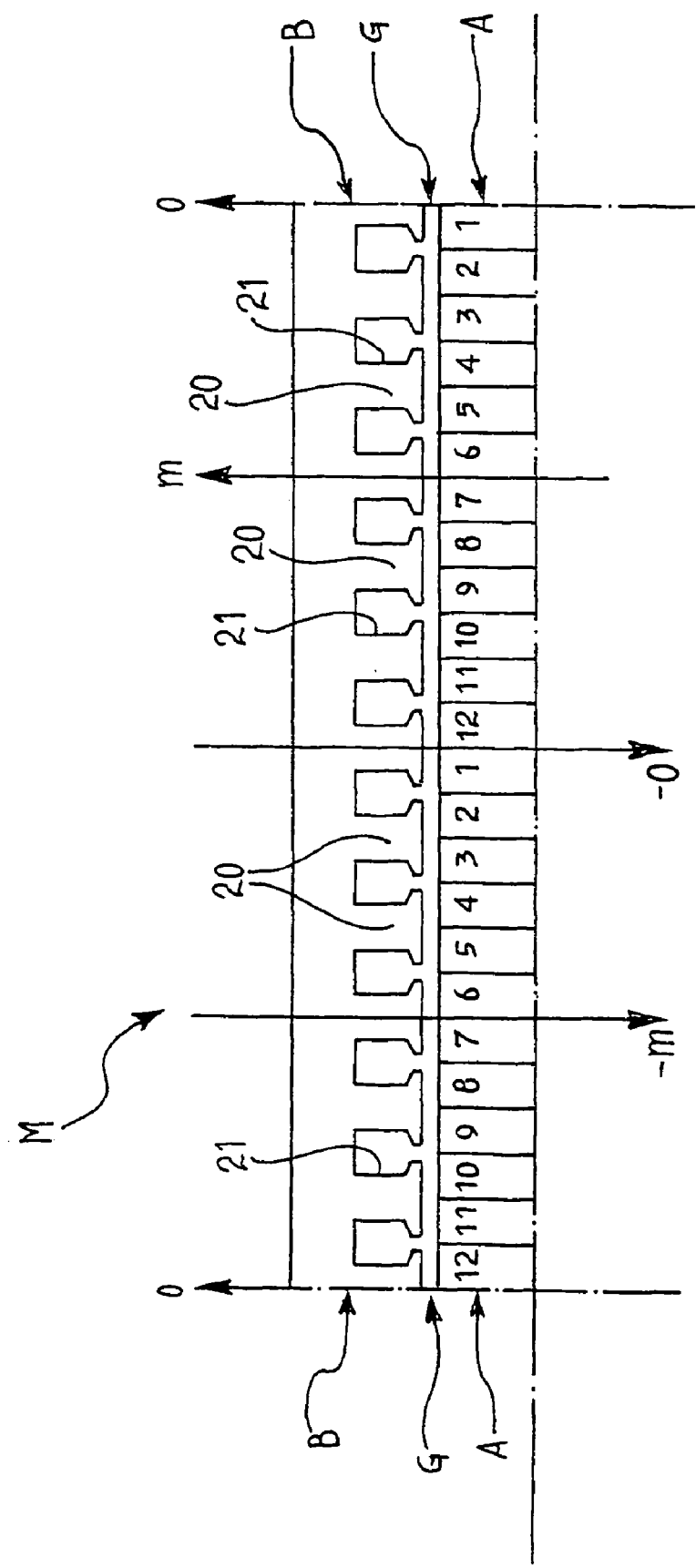

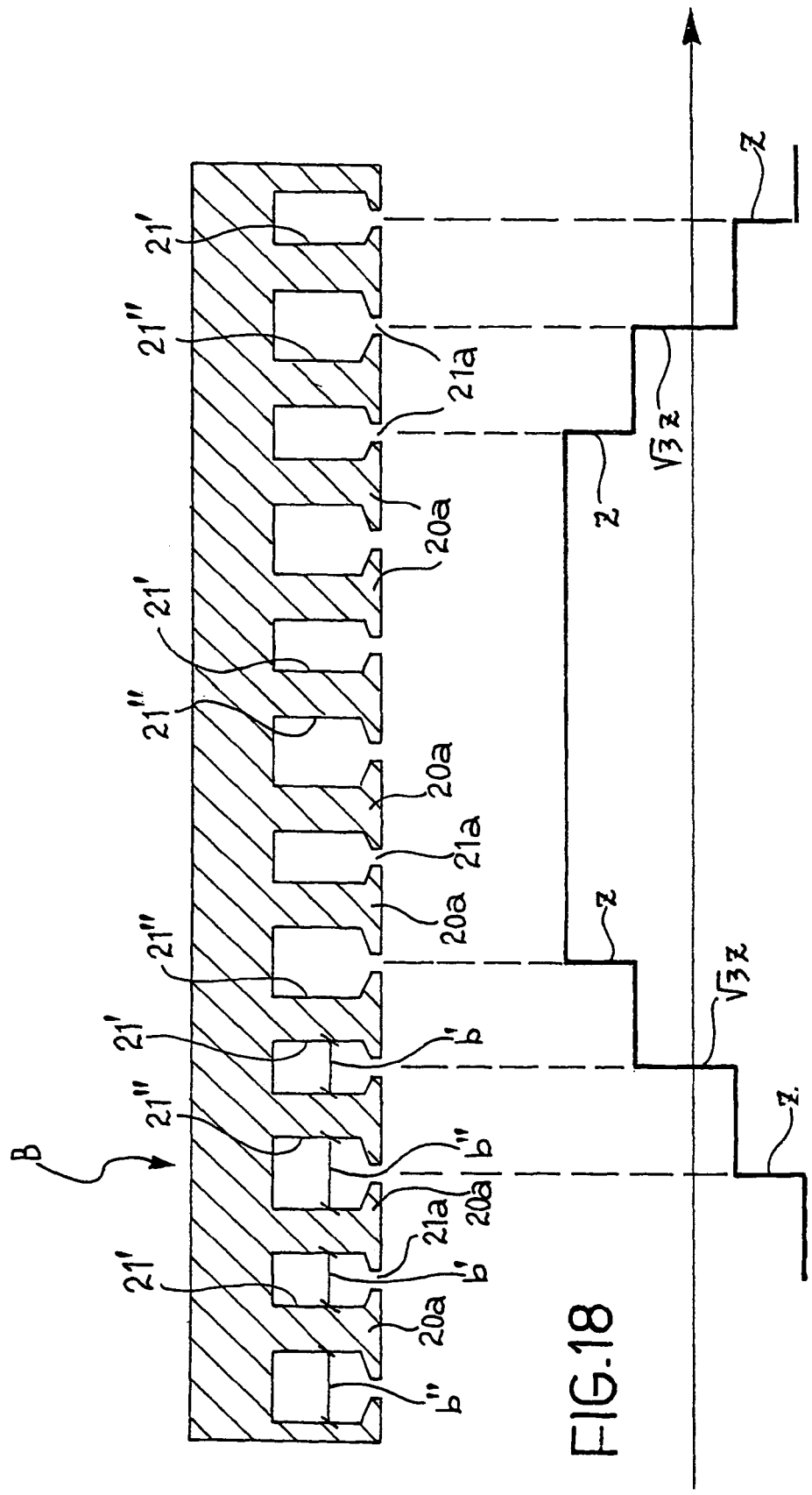

US 7,038,345 B2

SYNCHRONOUS ELECTRIC MACHINE

This is a National Stage Entry of Application No. PCT/EP02/02172 filed Feb. 28, 2002; the disclosure of which is incorporated herein by reference.

FIELD OF THE INVENTION

The present invention relates in general to synchronous electric machines.

More specifically, the subject of the invention is a synchronous electric machine comprising an armature and an inductor between which is defined an air gap, the armature having at least one pair of poles;

the inductor having, for each pair of poles of the armature, n teeth alternating with n slots the lengths of which presented to the air gap are essentially constant in the direction of relative displacement between the inductor and the armatures;

the inductor being provided with a winding.

OBJECTS AND SUMMARY OF THE INVENTION

One object of the invention is to provide indications to enable production of electric synchronous machines of low weight and high efficiency, able to allow an optimum compromise between performance or characteristics of quantitative type, such as torque density or maximum obtainable power, and the performance characteristics of qualitative type such as magnitude of the undulation or ripple in the output characteristics of the machine.

A particular object of the invention is to provide synchronous electric machines characterised by a quantitative performance close to the physical limits, by means of the control of the distributions of magnetic field which couple inductor and armature, in particular extending such capacity for control, and therefore of dimensioning, to the region of the maximum values of torque and/or power specified for each application.

One object of the invention in particular is to provide indications able to allow the control of the qualitative performance of the electric machine, in particular undulations in the values of its parameters such as torque and power produced, which undulations are inevitably associated with the average values produced and which are required for the electromechanical conversion of energy.

In summary, the object of the invention is therefore to define an organic conception of synchronous electric machine capable of indicating the free parameters or the degrees of freedom available for dimensioning, as well as the (minimum) properties which these parameters must satisfy, the number of such parameters being high to allow control of the quantitative and qualitative aspects of each specific application at the same time.

This and other objects are achieved according to the invention with an electric machine of synchronous type the salient characteristics of which are defined in the annexed claim 1.

THE DRAWINGS

Further characteristics and advantages of the invention will become apparent from the following detailed description, given purely by way of non-limitative example, with reference to the attached drawings, in which:

FIG. 2 is a partially sectioned view which shows a portion of the inductor and the armature of a linearly developed synchronous electric machine, corresponding to a pair of poles of the armature;

Figure 13:
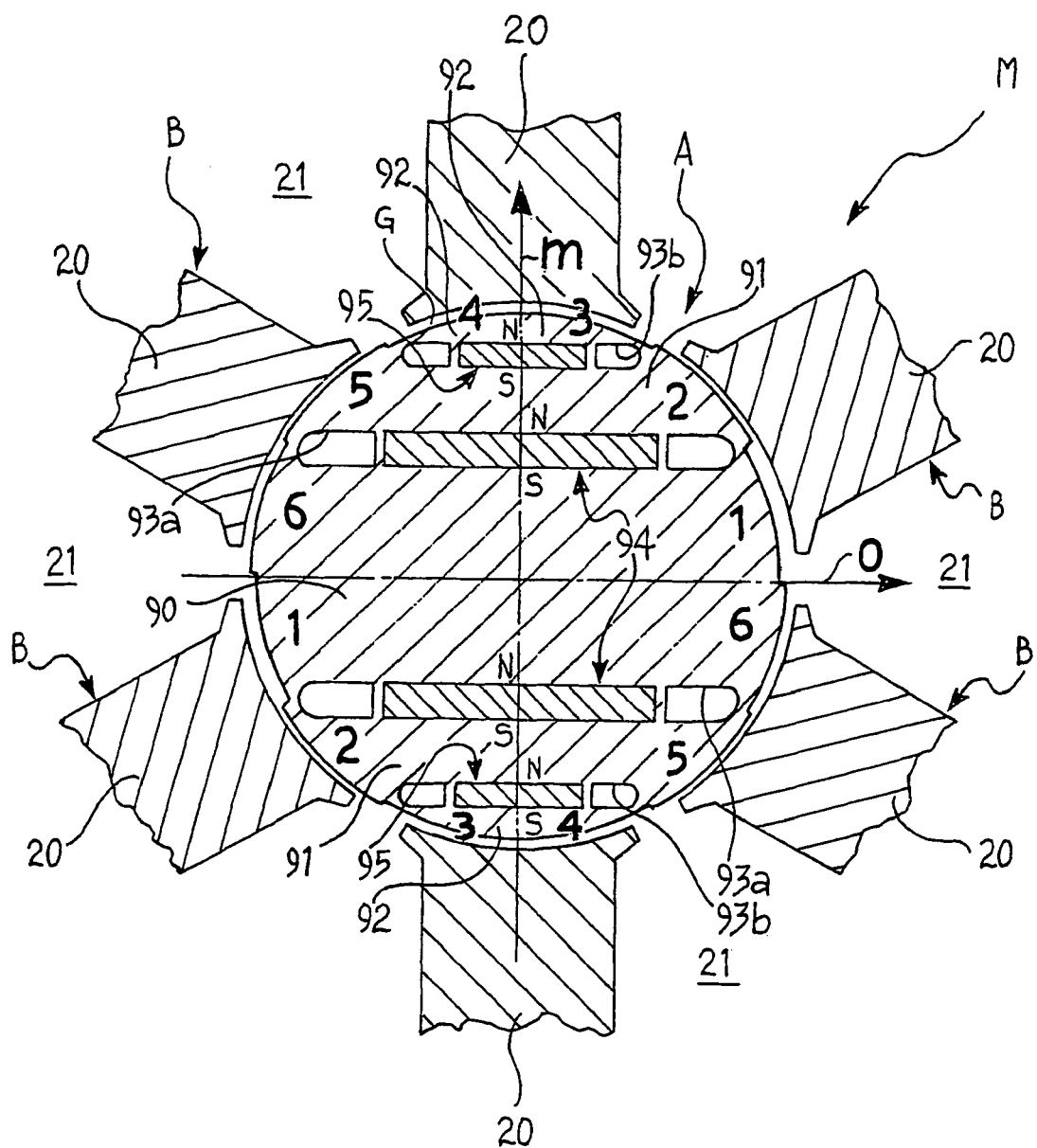
Figure 14:
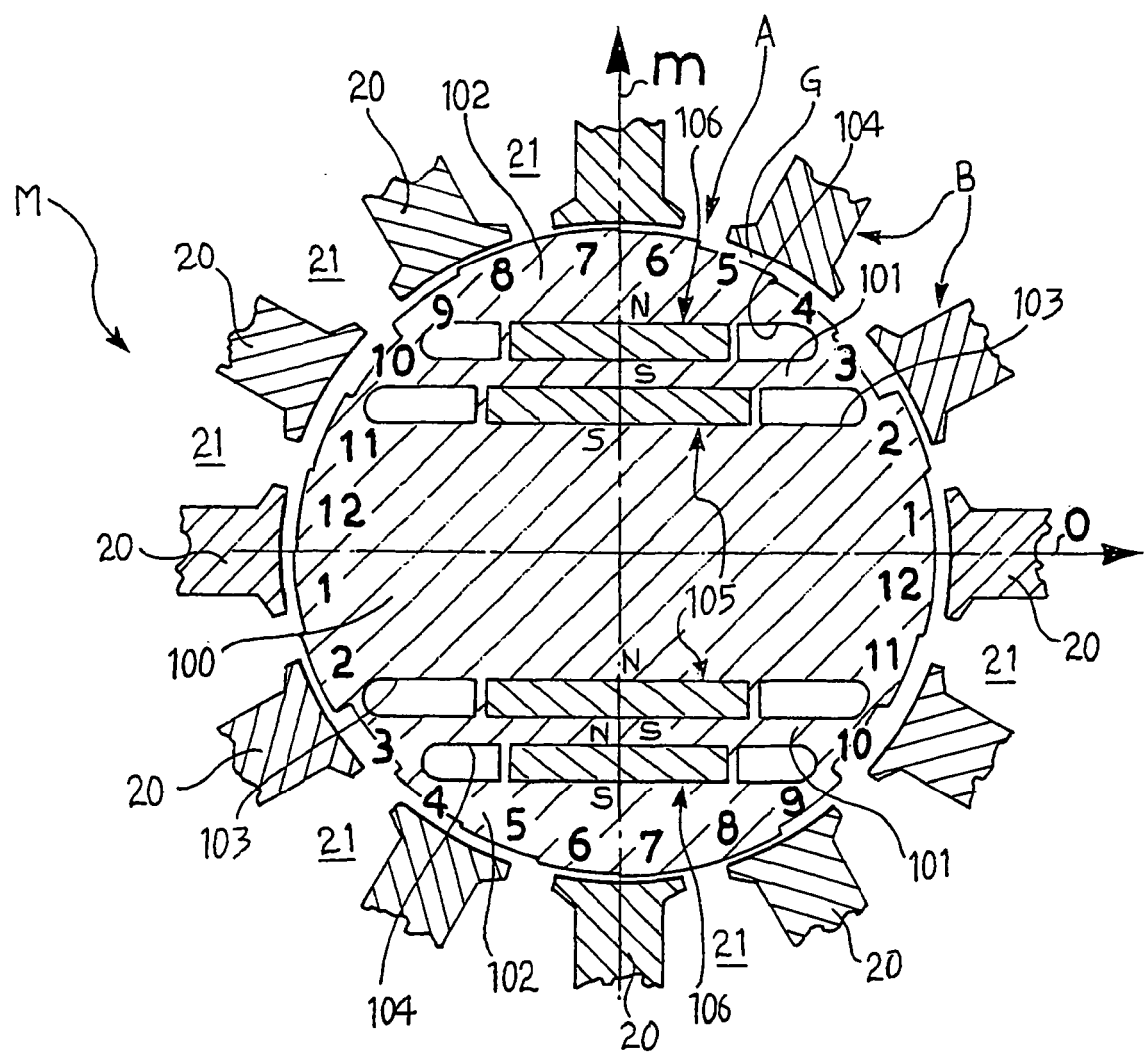
Figure 15:
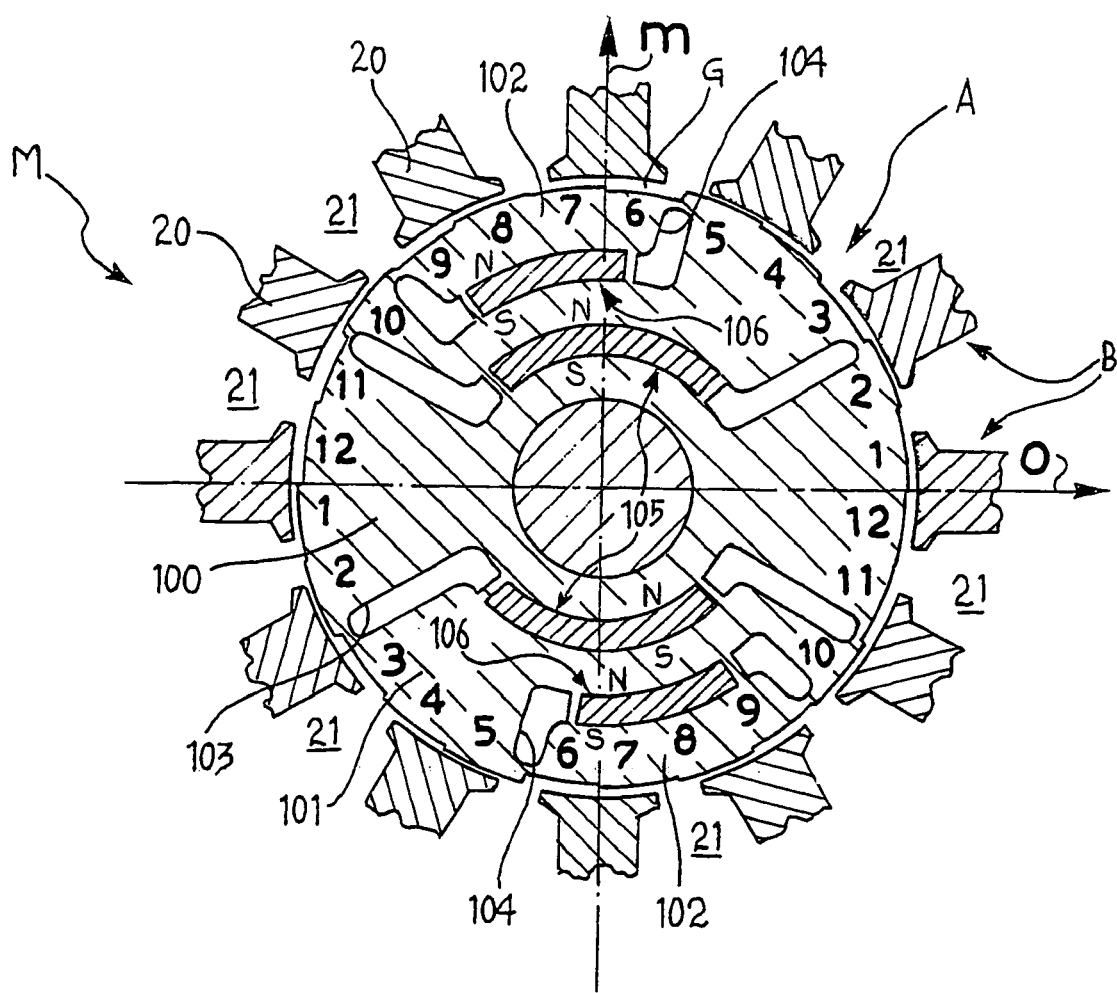
Figure 16:
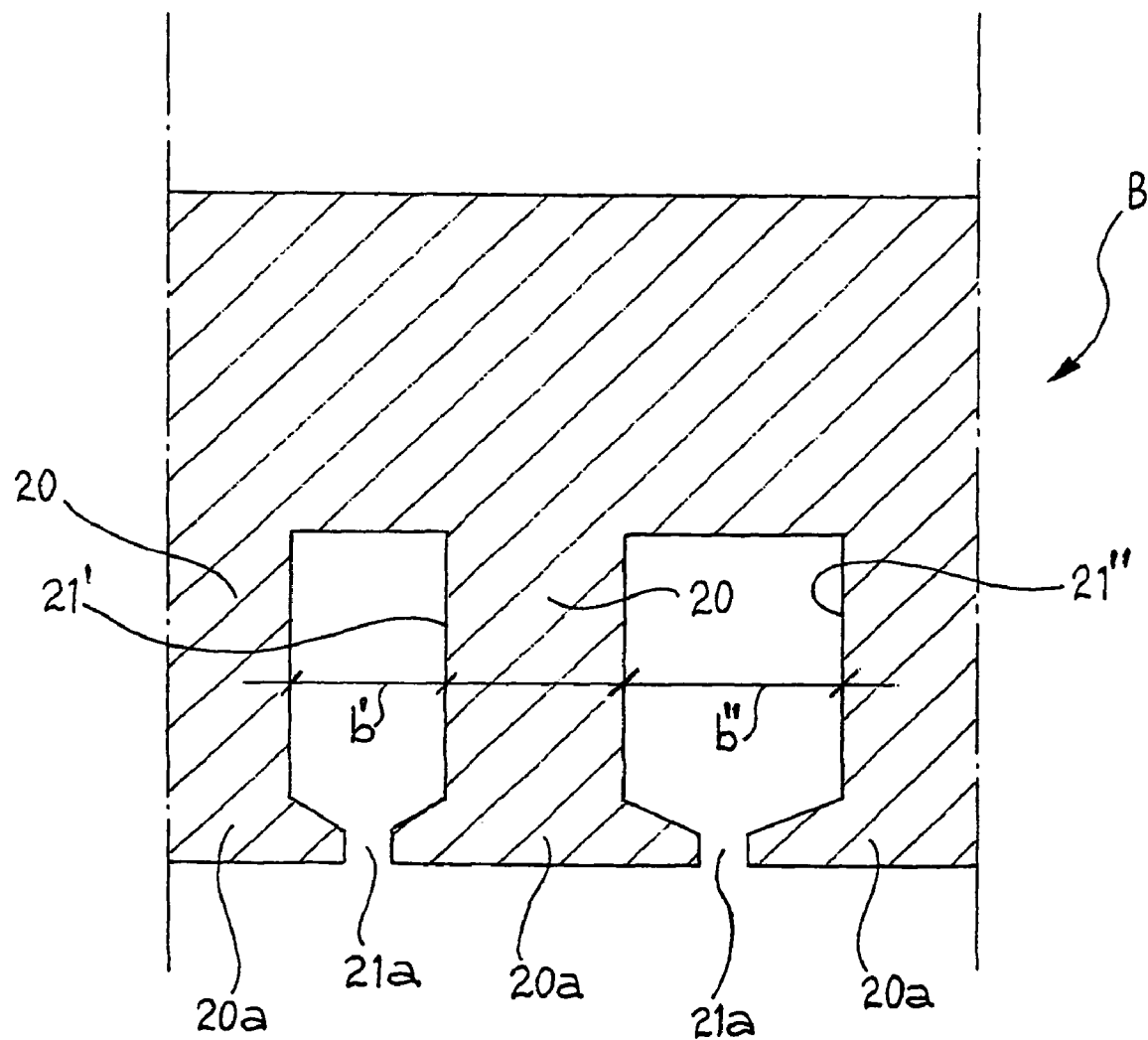

Figures from 8 to 12 are partial views in transverse section of synchronous machines with n=12 slots and a pair of symmetrical armature poles;

FIG. 13 is a transverse section of a synchronous machine with n=6 slots and a pair of asymmetrical armature poles;

FIGS. 14 and 15 are sections of a synchronous machine with n=12 slots and a pair of asymmetrical armature poles;

FIG. 16 is a sectioned partial view which shows a linearised portion of the inductor of a synchronous machine;

FIG. 17 is a linearised representation of the inductor of a synchronous machine the slots of which are formed in conformity with the arrangement described in relation to FIG. 16; and FIG. 18 is a graph relating to the distribution of the conductors of the winding for the inductor of FIG. 17.

DESCRIPTION

Figure 1A:
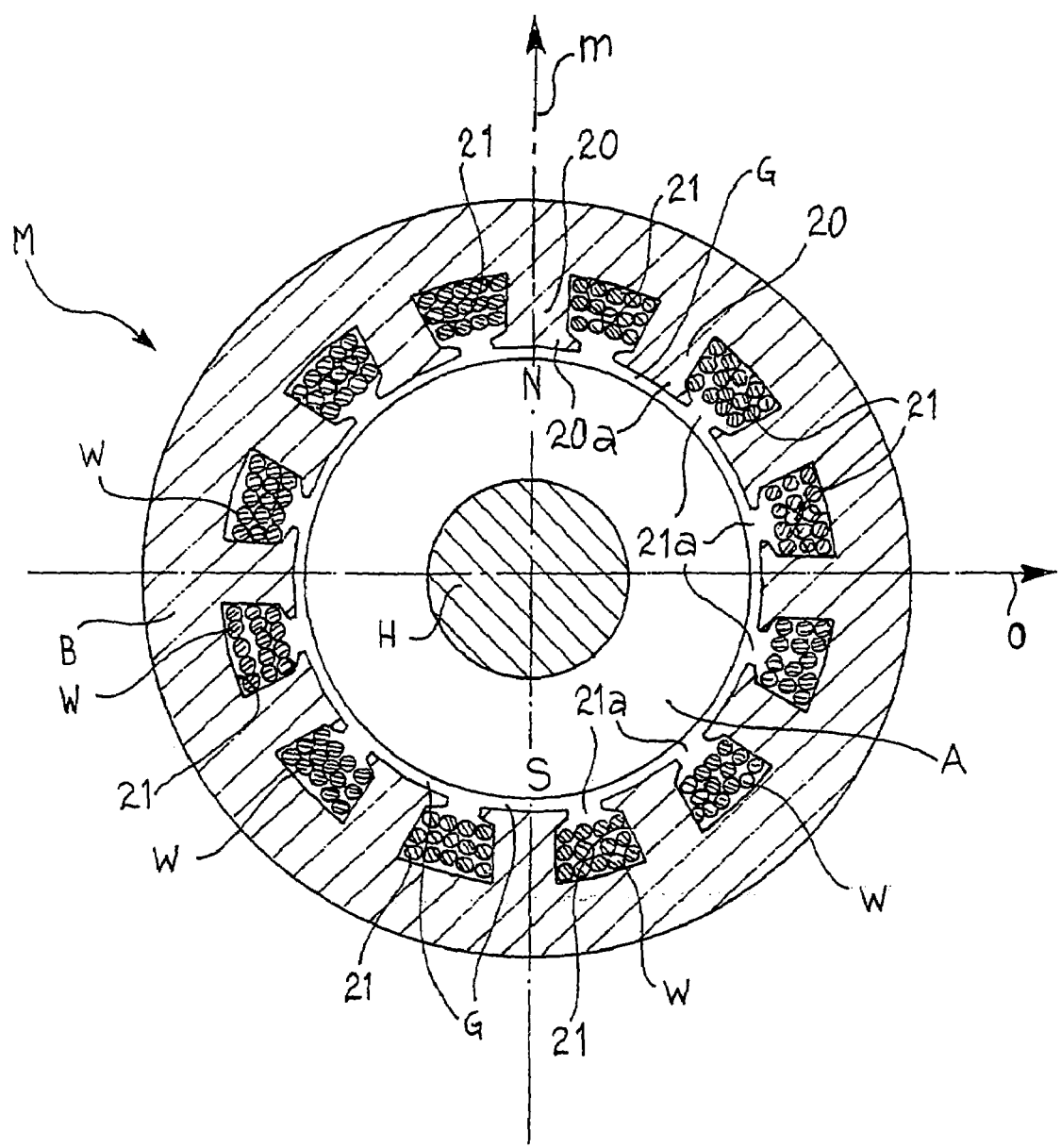
FIG. 1a is a partially sectioned view which shows the transverse section of a synchronous electric rotary machine with inductor outside the armature.

With reference to FIG. 1a, a synchronous electric machine M comprises an armature A fixed to a shaft H, and an inductor B.

The armature A has at least one pair of magnetic poles N and S (north and south).

The inductor B has n teeth 20 and n slots 21 alternating with one another for each pair of magnetic poles of the armature A.

Between the inductor B and the armature A is defined an air gap G.

At the air gap G the teeth 20 of the inductor B have respective pole shoes 20a having essentially constant respective angular extent or length.

At the air gap G the slots 21 of the inductor have respective openings or mouths 21a, having essentially the same angular extent or length.

In a manner known per se, the inductor B is provided with a winding W formed by conductors wound and located in the slots 21.

Figure 1B:
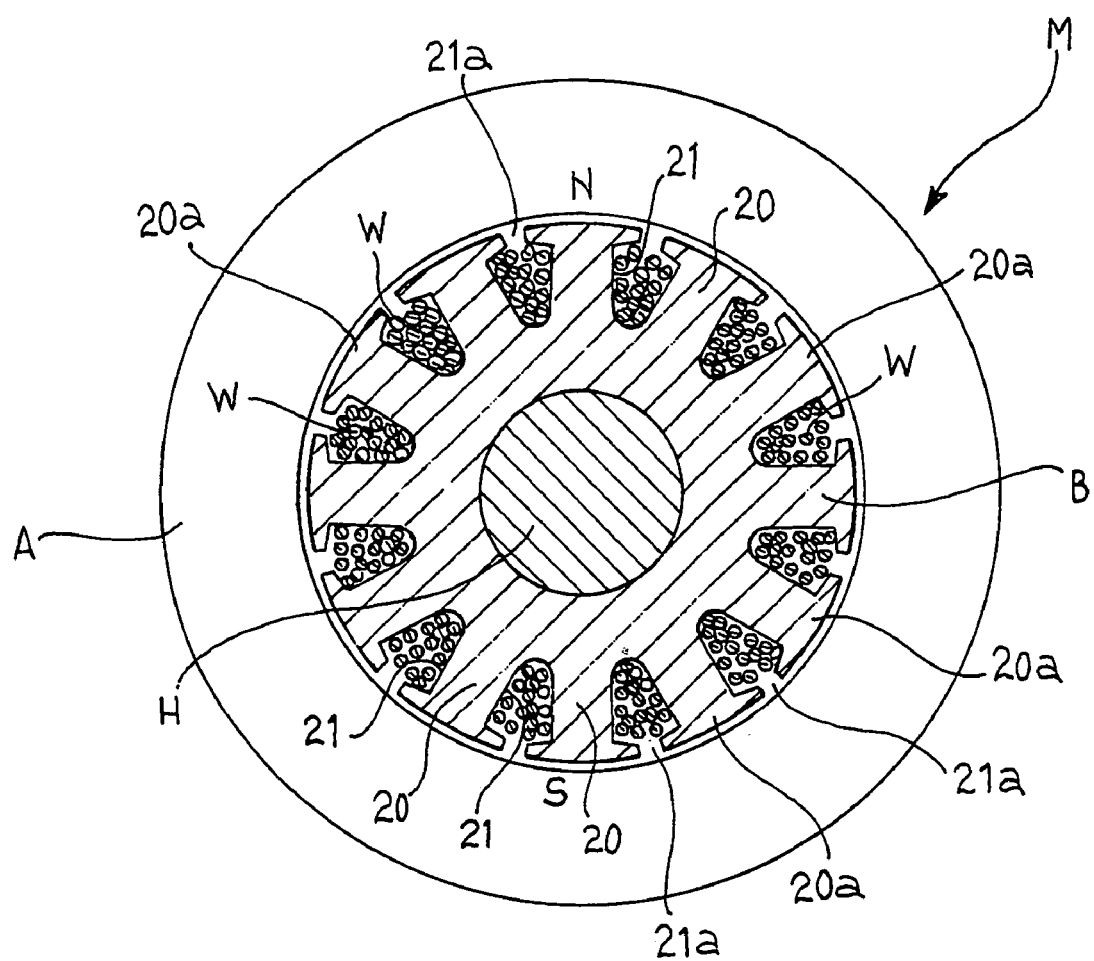
FIG. 1b is a partially sectioned view which shows the transverse section of a rotary synchronous electric machine with an inductor within the armature.

In FIG. 1b is shown the general structure of a synchronous electric machine in which the armature A surrounds the inductor B. In FIG. 1b the parts and elements already described with reference to FIG. 1a have again been allocated the same alphanumeric symbols.

A synchronous electric machine can however be formed (in a manner known per se) with a linear inductor and armature.

Armature Sampling

As will become apparent more clearly hereinafter, a synchronous electric machine according to the invention is characterised in that the surface of the armature A facing the air gap is divided into 2n elements or samples having substantially the same angular extent, that is—more generally—the same length in the direction of relative displacement between inductor and armature.

In FIG. 1a, the reference letters o and m indicate two transverse axes of the machine: the axis o is the pole separation axis of the armature A, whilst the axis m is an axis at right angles to the axis o, that is to say (in the case of an armature with symmetrical poles) the axis of symmetry of the armature poles.

In FIG. 2 the inductor B and the armature A of the synchronous electric machine M of FIG. 1a are shown linearly developed. The inductor in the example of FIGS. 1a and 2 has n=12 teeth 20 alternating with n=12 slots 21.

Correspondingly, as indicated above, the surface of the armature A facing the air gap G is divided into two groups of n=12 elements or samples, identified in each group with the numerals from 1 to 12 proceeding from the axis o towards the left as seen in FIG. 2, or in an anti-clockwise sense as seen in FIG. 1a.

Each element or sample of the armature A has a respective value of magnetic potential or magnetomotive force $\tau_i$ (with i varying from 1 to n=12 in FIG. 2) which is essentially constant over the width of the sample in the direction of relative movement between the inductor and the armature.

Each armature sample is moreover associated with a respective total magnetic permeance value $p_i$ at the air gap G in a predetermined alignment condition or relative position between the inductor B and the armature A.

Reference Alignment Condition

Figure 3A:
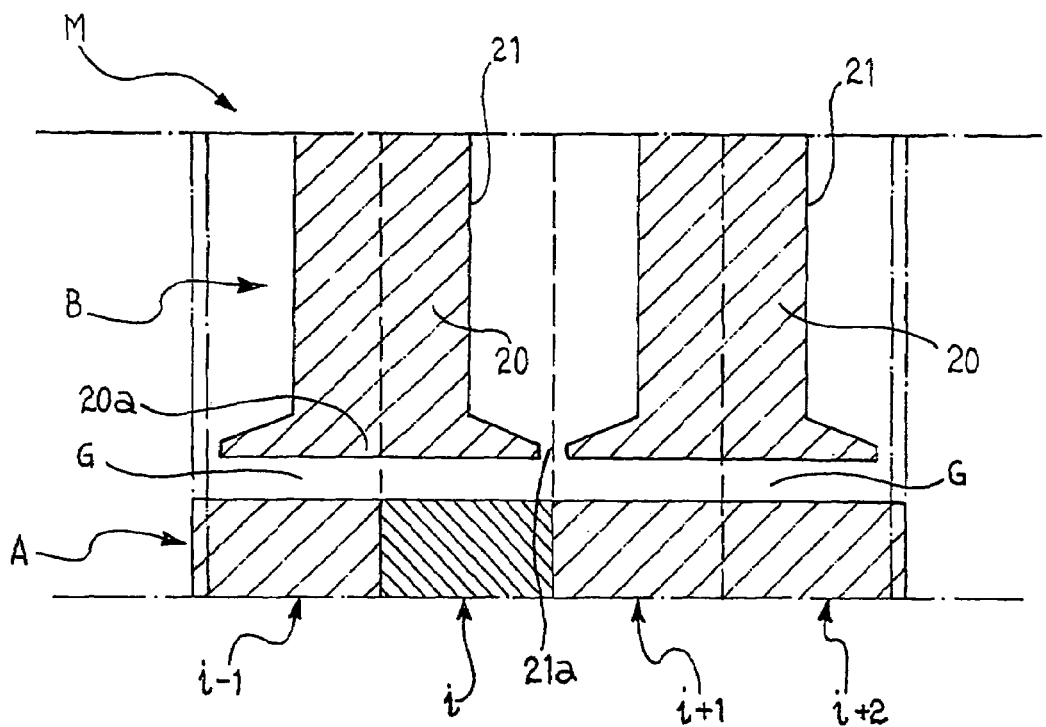
FIGS. 3a and 3b are partial schematic representations of portions of the inductor and the armature of a synchronous electric machine shown in two different relative alignment conditions which have a significance for the following description.
Figure 3B:
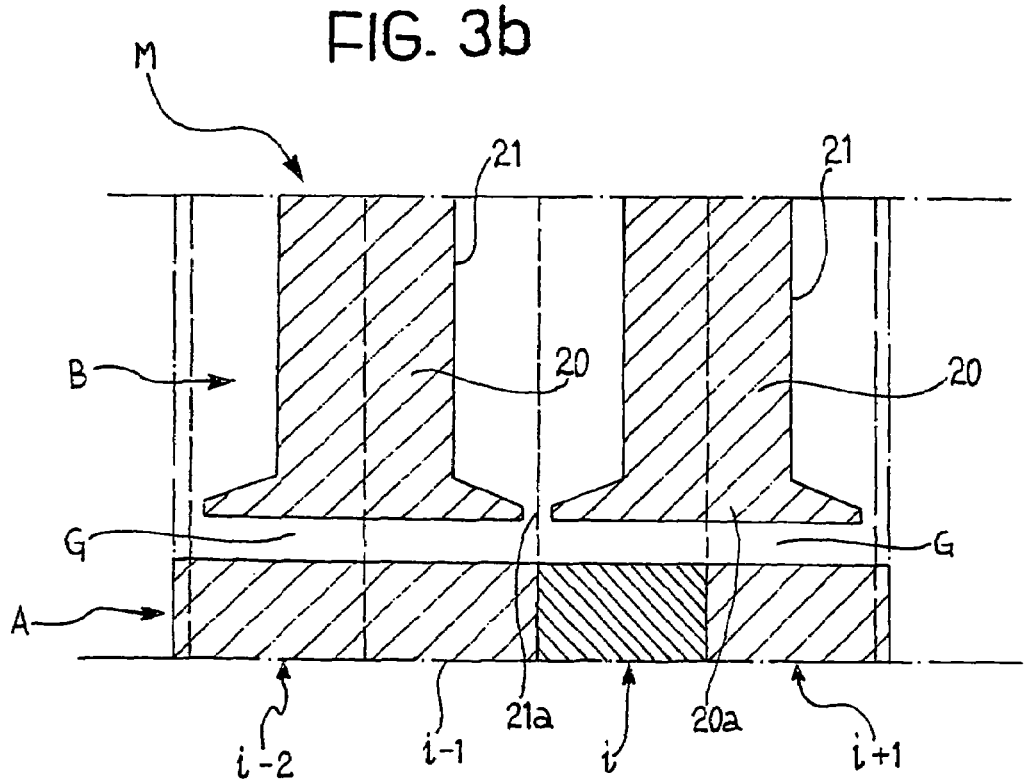

With reference to FIGS. 3a and 3b, there will now be defined two particular reference alignment conditions or relative positions between the inductor B and the armature A, useful for the considerations which will be developed hereinafter. These positions are the single necessary and sufficient positions for designing all the characteristics of an electric machine according to the invention.

With reference to FIG. 3a, a first alignment condition or relative position of a general sample i of the armature A is that in which the sample extends from the centre line of the terminal surface of the pole shoe 20a of one tooth 20 of the inductor B to the centre line of the aperture or mouth 21a at which an adjacent slot 21 opens into the air gap.

In FIG. 3b is shown a second reference alignment condition or relative position, in which the general sample i of the armature A extends from the centre line of the opening or mouth 21a at which a slot opens to the air gap and the centre line of the pole shoe 20a of the next tooth 20.

As already indicated above, in a synchronous electric machine according to the invention each of the 2n samples of the armature A is formed in such a way that it is magnetically coupled with the inductor B through the air gap G by means of a respective total magnetic permeance value $p_i$ in a predetermined alignment condition or relative position, or rather in one of the two positions defined above with reference to FIGS. 3a and 3b.

Structure of the Armature

As will become clearer in the light of the examples which will be described in detail hereinafter, in a synchronous machine M according to the invention the armature A is subdivided into a plurality of layers each of which comprises one or more bodies of ferromagnetic material magnetically distinct from one another, each of which bodies couples at least two armature samples in such a way as to ensure a substantial magnetic equipotential.

Figure 4:
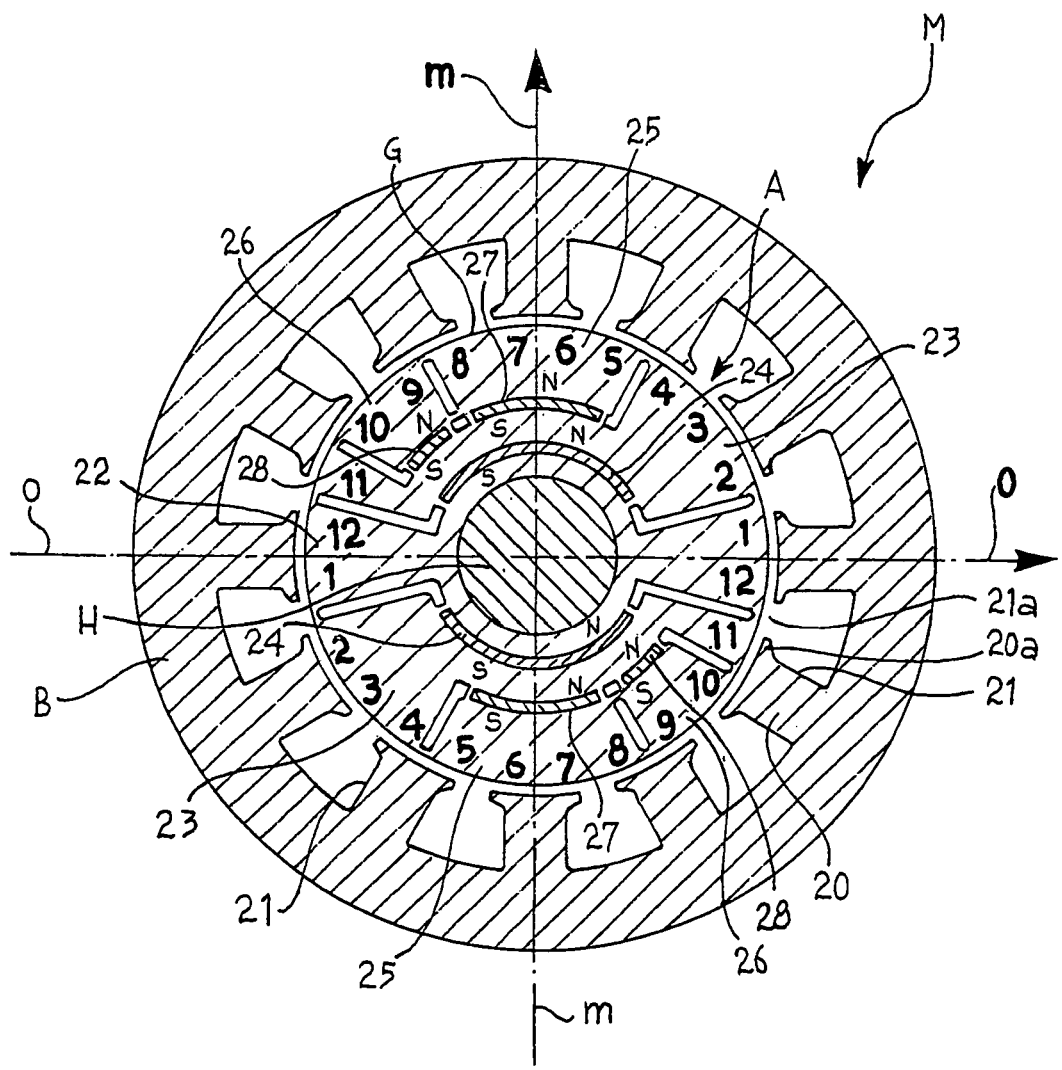
FIG. 4 is a sectioned partial view of a synchronous electric machine having a division of the armature according to the invention and having n=12 inductor slots and a pair of armature poles.

In FIG. 4 of the attached drawings is shown qualitatively a synchronous electric machine M having armature layers and bodies according to the invention, with asymmetrical armature poles and with n=12 slots of the inductor B and a pair of poles of the armature A.

In conformity with what has been stated above, the armature A of the machine shown in FIG. 4 has its surface facing the air gap G divided into 2n=24 elements or samples. These samples are separated into two groups of n=12 samples numbered from 1 to 12.

The armature A comprises a plurality of layers and bodies of ferromagnetic material. The first layer coincides with a central body 22 the opposite ends of which each comprise two armature samples, indicated 1 and 12, straddling the axis o. This body 22 is at zero magnetic potential $\tau$ in that it is subject to opposite magnetic excitations at its ends.

The armature A of the machine shown in FIG. 4 also includes two further layers formed by bodies 23 situated on opposite sides of the body 22. The bodies 23 have asymmetrical shape and antisymmetrical relative disposition. Each body 23 faces the air gap G with two non-contiguous sets of contiguous samples. In particular, in the illustrated example, each body 23 has one end which faces the air gap G with a sample, indicated 11 and the other end faces the air gap with three samples, indicated 2, 3 and 4.

In the space defined between the central body 22 and the bodies 23 are disposed respective permanent magnets indicated 24, magnetised in a sense substantially parallel to the axis m, that is having the magnetic polarities indicated by the letters N and S.

Each pole of the armature A of the machine M shown in FIG. 4 also has a further layer comprising two bodies of ferromagnetic magnetic material, indicated 25 and 26. In the example illustrated in FIG. 4 the bodies 25 have symmetrical geometric disposition with respect to the axis m, facing the air gap G with the four samples indicated 5, 6, 7 and 8. The bodies 26 each face the air gap with two samples, indicated 9 and 10 contiguous to the samples of the associated body 25 of the same layer.

Between the bodies 23 and 25 are defined spaces in which are located respective permanent magnets 27. In the space defined between the bodies 23 and 26 are located other permanent magnets 28.

FIG. 4 is dedicated to showing a transverse fraction of the armature, and therefore, for simplicity, it is drawn as having a constant radial air gap. In reality, in general, the air gap can have a variable width in that the values $p_i$ of the total magnetic permeance at the air gap, like the associated magnetic potentials $\tau_i$ of the individual samples of the armature A, are determined according to predefined criteria.

Internal Magnetic Permeance $P_{ij}$

A series of magnetic parameters of the structure of the armature is constituted by the so-called internal magnetic permeance between different bodies of the armature.

In general, two ferromagnetic bodies i and j at least partially adjacent, are magnetically coupled by the so-called "internal" permeance $P_{ij}$, representative of all, but only, the magnetic flux exchanged between these bodies within the armature structure, that is to say without considering flux lines which involve the air gap G in some way.

Odd Bodies

In general, in a synchronous machine according to the invention the armature A must comprise at least one ferromagnetic body which faces the air gap G through two non-contiguous sets of samples, each of which comprises an odd number of contiguous samples. This ferromagnetic body will hereinafter be indicated as an "odd body".

It can be verified that the exemplary machine illustrated in FIG. 4 satisfies this criterion. In fact, each of the bodies 23, which comprises the samples 11 and the samples 2, 3 and 4 is an "odd body" the point of which facing the air gap G has two non-contiguous sets of samples (11) and (2, 3, 4) each of which comprises an odd number (1 and 3 respectively) of contiguous samples.

In general, if the number n of teeth or slots of the inductor B is even, the number 2n of samples of the inductor A would be twice even, that is to say a multiple of 4: in this case the number of "odd bodies" is even, that is there is the same number of them in each of the poles of the armature.

If, on the other hand, the number n of teeth or slots of the inductor B is odd, the number 2n of samples of the armature A is simply even, that is to say a multiple of 2 but not a multiple of 4. In this case the armature A certainly has a central "odd" body, that is to say across the axis $\underline{o}$ of magnetic potential $\tau=0$, that is the body 30 of the armature of the machine shown by way of example in FIG. 6, which body forms the samples 1—1.

Otherwise, with an inductor B having an even number n of teeth or slots, the central body of magnetic potential $\tau=0$ must be arranged by the designer, by associating together at least the two samples adjacent to the axis $\underline{o}$, (as in FIG. 4, see the body 22 which associates the samples 1 and 12), to have a greater number of samples which is in any event even, as will be seen further below with reference to for example FIG. 14.

Conditions on Values of Permeance Associated with the Samples of Each Body of the Armature In general, in a synchronous electric machine according to the invention, the armature samples are assigned respective alternating even and odd positions on the surface facing the air gap along the direction of relative displacement between the inductor and armature. For each body of the armature having magnetic potential $\tau$ substantially different from zero one has that $$\sum_x p_x = \sum_y p_y, \text{ with } x = 2k, y = 2k+1, k = 0, 1, 2, 3 \ldots \quad (1)$$

that is the sum of the total magnetic permeances of the samples in even positions is substantially equal to the sum of the total magnetic permeances of the samples in odd positions, for the purpose of minimising the variations of the magnetic energy stored in the machine upon variation in the relative position between the armature A and the inductor B, and in particular the variations relating to the excitation produced by the individual permanent magnets inserted in the armature structure.

The inductor and the Parameters of the Machine

In a synchronous machine according to the invention, the inductor B is conveniently formed in such a way that it is able to generate a distribution of magnetomotive force which is "seen" by the armature A identically in all relative positions spaced from one another by one slot pitch P of the inductor.

Moreover, with reference to the two alignment conditions previously defined with reference to FIGS. 3a and 3b, the values of all the magnetic parameters of the electric machine M calculated in the components along two separate axes of the armature A, for example at right angles to one another such as the axes $\underline{o}$ and $\underline{m}$, are substantially equal to one another in the said two alignment conditions.

In general, for an electric machine the following vector relation holds true:

$$\vec{\lambda} = \begin{bmatrix} \lambda_o \\ \lambda_m \end{bmatrix} = \begin{bmatrix} L_o & L_{om} \\ L_{mo} & L_m \end{bmatrix} \begin{bmatrix} i_o \\ i_m \end{bmatrix} + \begin{bmatrix} \psi_o \\ \psi_m \end{bmatrix} \quad (2)$$

in which:

$\vec{\lambda}$ is the vector of flux linked by the inductor windings;

$\lambda_o, \lambda_m$ are the components of $\vec{\lambda}$ along two axes $\underline{o}$ and $\underline{m}$ of the armature, at right angles to one another; the axis $\underline{o}$ being an axis of separation between N and S poles of the armature;

$L_o$ and $L_m$ are the values of self-inductance measured along the two axes $\underline{o}$ and $\underline{m}$;

$L_{mo}=L_{om}$ are the values of mutual coupling between the magnetomotive forces and fluxes along the said axes $\underline{o}$ and $\underline{m}$;

$i_o$ and $i_m$ are the components along the axes $\underline{o}$ and $\underline{m}$ of the vector representative of the currents circulating in the windings, which produce the overall magnetomotive force generated by the inductor; and $\psi_o$ and $\psi_m$ are the components of flux linked by the windings of the inductor along the along the axes $\underline{o}$ and $\underline{m}$ respectively, for $i_o=i_m=0$ that is to say in the absence of excitation of the inductor.

In general, the parameters $L_o$, $L_m$, $L_{om}=L_{mo}$, $\psi_o$ and $\psi_m$ vary as a function of the position co-ordinate along the direction of relative movement between the inductor and armature, that is as a function of the angular position co-ordinate in a rotary machine.

These parameters have a respective average value and a respective undulation or ripple.

Invariance of the Parameters in the Two Reference Positions

A machine according to the invention advantageously allows a minimisation of the ripple of the parameters, achieved via a substantial equalisation of the characteristics of the machine in the two previously defined reference positions. This equalisation is represented by the following conditions:

$$L_{o,1} \cong L_{o,2} \quad (3a)$$

$$L_{m,1} \cong L_{m,2} \quad (3b)$$

$$L_{om,1} \cong L_{om,2} \quad (3c)$$

$$\psi_{o,1} \cong \psi_{o,2} \quad (3d)$$

$$\psi_{m,1} \cong \psi_{m,2} \quad (3e)$$

in which $L_{o,1}$ and $L_{o,2}$ are the values of $L_o$ measured in the said two alignment conditions or reference positions;

$L_{m,1}$ and $L_{m,2}$ are the values $L_m$ measured, in the said two alignment conditions;

$L_{om,1}$ and $L_{om,2}$ are the values of $L_{om}$ and $L_{mo}$ in the two alignment conditions;

$\psi_{o,1}$ and $\psi_{o,2}$ are the values of $\psi_o$ in the two alignment conditions; and $\psi_{m,1}$ and $\psi_{m,2}$ are the values of $\psi_m$, again in the said two alignment conditions.

Ripple and Arrangements for its Further Reduction

The period of the undulation or ripple in the machine parameters is a function of the pitch P of the slots in the inductor B.

In machines with n=3 and n=6, with conventional three-phase winding the period of the undulation in the said parameters is equal to the period or pitch P of the inductor slots.

In machines with n=12 inductor slots per pair of armature poles, the undulation of the said parameters generally also has a double period, that is 2P, besides a period P.

In general, a substantial cancellation of the ripple component of period 2P in the said parameters in an electric machine can be obtained by adopting one of the following alternative solutions (known per se):

formation of the inductor with a hexaphase winding, that is to say with a pair of diametrally offset three-phase windings, supplied with two three-phase currents offset in time;

adoption of a (suitable) distribution of the conductors in the three-phase winding W of the inductor B.

The substantial cancellation of the ripple of period 2P can however be conveniently obtained by forming the inductor with slots of differentiated form as will be described better hereinafter.

In general, for a minimisation of the upper harmonics of the slot pitch P the following criteria are in any event valid.

The first harmonic can be essentially eliminated by forming the synchronous machine in such a way that it has all the characteristics defined in claims 1 to 4, summarised by the systems of equations derived from (1) and by imposing the equations (3a–3e).

The second harmonic can be reduced if the armature B is formed (with a known technique called "stepping") in two portions axially offset by about ¼ of the pitch P of the slots 20 in the inductor B. According to the invention these two armature portions preferably have respective transverse sections which are different from one another, nevertheless, however, each satisfying at least the characteristics defined in claim 1, and preferably all the characteristics defined in claims 1 to 4. Moreover, such armature portions possibly have respective dimensions different from one another along the axis orthogonal to the direction of relative displacement between inductor and armature.

The third harmonic can be reduced substantially to zero with suitable widths of the openings or mouths 21a of the slots 21 of the inductor B. In particular, it is convenient that the said openings or mouths of the slots should have, in the direction of relative displacement between inductor and armature, a width close to ¼ or, preferably for reduction of the other harmonics, close to ⅛ of the pitch P of the inductor slots.

The fourth harmonic, like the second, can be minimised by forming the armature A in such a way that it has four portions which, in the said direction of relative displacement, are offset from one another by ⅛ of the pitch P of the inductor slots, with a maximum value of ⅜ in the offset between the outer portions of the armature. Such portions, of the same or (possibly) different dimensions and transverse sections, must however satisfy at least the conditions defined in claim 1, and preferably the conditions defined in claims from 1 to 4.

The above-described sequence of provisions progressively reduces the magnitude of the ripple in the torque which is encountered in electric machines upon variation in the relative position of the armature A and the inductor B as far as satisfying the most stringent requirements of high quality applications is concerned, while maintaining the possibility of controlling the quantitative contribution of each portion of the machine to the total torque by applying also to each portion the criteria for control of the quantity of magnetic flux in the individual teeth of the inductor up to the level of maximum torque required, as will appear more clearly hereinafter.

Moreover, techniques, known per se, of "skewing" of the armature or the inductor are applicable to the machine of the invention.

In this case the invention nevertheless brings the substantial benefit of cancellation of the first, or fundamental harmonic of period P in the parameters of each section of the machine, for which skewing is applicable by an amount (half slot pitch) substantially halved with respect to what is known and usual in the prior art.

In each case it is advisable to maintain the cancellation of the third harmonic (and the other odd harmonics) by the adoption of a slot opening equal to ¼ or ⅛ of the slot pitch as already mentioned. However, by the use of skewing, the maximum offset between machine sections is increased, thus reducing the possibility of exercising quantitative control of the magnetic field in all the sections, at least in the region of the maximum torque at which the phenomena of magnetic saturation become manifest locally.

Conditions on the Distribution of Induction in the Inductor

When designing a synchronous electric machine it is dimensioned in such a way that it is able to deliver a predetermined maximum torque $T_M$ and a predetermined maximum power $P_M$. Correspondingly, the armature A of a machine according to the invention is formed in such a way that in operating conditions close to that of maximum power delivery, in each of the two alignment conditions previously defined with reference to FIGS. 3a and 3b one has that:

a) the induction distribution in the teeth 20 of the inductor B has values substantially close to, preferably less than (for efficiency at high speed) the value of the saturation induction of the material of the teeth 20 over at least half and preferably over not more than ¾ of the pole pitch of the armature A;

b) this induction distribution is moreover substantially in quadrature with the distribution of magnetic potential generated by the inductor at the pole shoes 20a of the teeth 20 of the inductor B; and c) the said induction distribution has a variation which increases substantially monotonically over an extent about equal to one pole pitch of the armature, and decreases substantially monotonically over the subsequent or preceding pole pitch.

In a real synchronous machine the magnetic flux which flows in one tooth of the inductor comprises not only the flux exchanged with the portion of the armature facing it, but also a flux which is exchanged with the pole shoes of the contiguous teeth (flux dispersed between the slots) by the effect of the magnetic permeance existing between contiguous teeth.

In the prior art this dispersed flux represents a limit to the achievement of the maximum theoretical performance: it limits the possibility of reducing the dimension of the slot opening, that is it limits the possibility of obtaining high air gap permeance; in any case a high dispersion permeance between the pole shoes of adjacent teeth involves, at full or high load, the anticipated occurrence of localised magnetic saturation phenomena in the body of those teeth of the inductor in which this dispersion flux has the same sign as the flux which crosses the air gap. These phenomena imply high increases in the losses in the ferromagnetic material of the inductor, in particular in the body of the teeth, and reduce the effective torque obtainable for a given current flowing in the inductor windings.

Calculation of the Flux and Magnitude of the Torque

Figure 5:
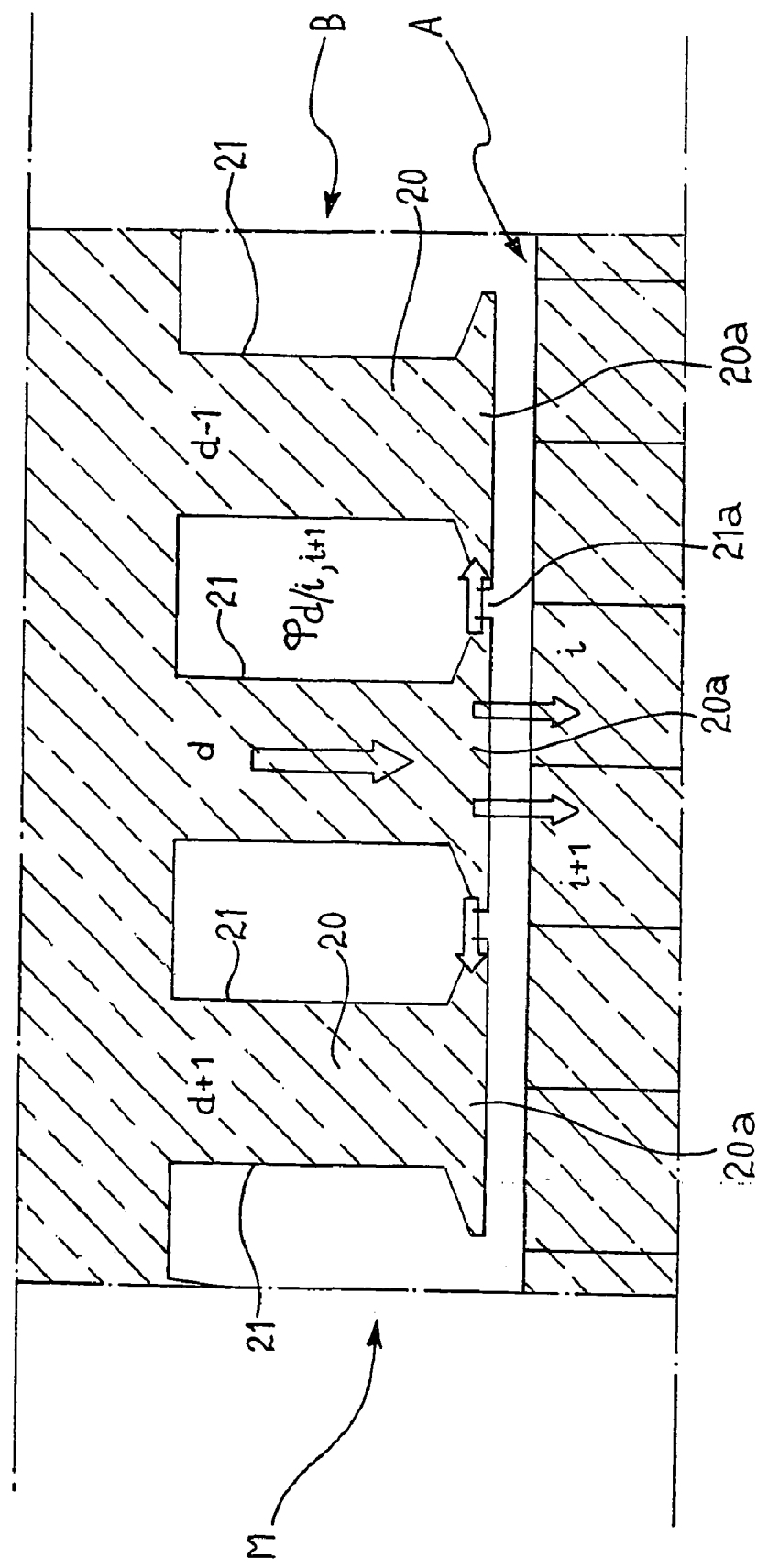
FIG. 5 is a linearised partial representation of a portion of an inductor and the corresponding portion of an armature.

By way of example, with reference to FIG. 5, to a first approximation the magnetic flux $\phi_d$, which flows in the body of a general tooth d of the inductor B in one of the two above-defined alignment conditions in which this tooth faces the samples i, i+1 of the armature A, can be expressed in the following manner:

$$\phi_{d i, i+1} = (\tau_d - \tau_i) p_i + (\tau_d - \tau_{i+1}) p_{i+1} + \quad (3f)$$

$$+ [(\tau_d - \tau_{d+1}) + (\tau_d - \tau_{d-1})] \cdot P_\alpha$$

in which $\tau_d$, $\tau_{d-1}$ and $\tau_{d+1}$ are the magnetic potentials of the pole shoes 20a of the teeth d, d−1 and d+1 respectively;

$\tau_i$ and $\tau_{i+1}$ are the magnetic potentials of the samples i and i+1 of the armature A;

$p_i$, $p_{i+1}$ are the total magnetic permeances associated with the samples i and i+1 of the armature A, and $P_\alpha$ is the magnetic dispersion permeance between the pole shoes 20a of two adjacent teeth of the inductor B.

The relation (3f) set out above makes it possible to calculate, for each of the two reference alignment conditions, the values of the flux distribution (that is the values of induction) in the bodies 20 of the teeth of the inductor B, which values must nevertheless satisfy the general conditions a), b) and c) set out above.

In a synchronous machine according to the invention the said conditions a), b) and c) can therefore be set to the parameters $\tau_i$, $p_i$ and $P_{ij}$ in such a way as also to compensate for the effect of the dispersion flux between the above-described slots, thus obtaining a further degree of freedom ($P_\alpha$) in the definition of the optimal slot opening for specific applications envisaged for the synchronous machine.

The general setting of the equation (3f) is applicable in the conditions of magnetic linearity in the inductor, that is to say when the drop in magnetomotive force in the ferromagnetic circuit of the inductor is substantially negligible with respect to that localised at the air gap. This general setting of (3f) nevertheless finds full application at full load, or rather in cases of incipient magnetic saturation in which the drop in magnetomotive force which is localised in particular in the body of the teeth can not be neglected a priori.

Type of Machine

Several peculiarities of synchronous electric machines with symmetrical armature poles and then with asymmetrical armature poles will now be considered.

Machines with Symmetrical Armature Poles

By symmetrical poles is meant poles which, in transverse section, have a specular symmetry with respect to an axis orthogonal to the air gap.

In machines according to the invention having symmetrical armature poles, whatever the number n of slots and teeth in the inductor, one has that $$L_{om,1} = L_{om,2} = 0 \,\forall n$$

$$\Psi_{o,1} = \Psi_{o,2} = 0 \,\forall n$$

Therefore, the relations (3a–3e) recorded above reduce to the following:

$$L_{0,1} = L_{0,2} \quad (4a)$$

$$L_{m,1} = L_{m,2} \quad (4b)$$

$$\Psi_{m,1} = \Psi_{m,2} \quad (4c)$$

By virtue of the symmetry of the section of the armature poles, the number of independent total magnetic permeances $p_i$ reduces to n/2.

In general, from the system of equations (4a) and (4b) noted above a first equation is derived in which the individual independent total magnetic permeances $p_i$ appear, as well as a second equation, substantially derived from the relation (4b), which correlates the total magnetic permeances $p_i$ to the internal magnetic permeances $P_{ij}$.

Finally, the relation (4c) allows one to write an equation which relates the independent magnetic permeances $p_i$ and the magnetic potentials $\tau_i$ associated with the armature samples under load and in particular under no load, that is in the absence of currents in the inductor windings.

From equations (4a), (4b) and (4c) it is thus possible to derive a first group of relations (equations) which correlate together the parameters $\tau_i$, $p_i$ and $P_{ij}$.

A further two groups of relations (inequalities and equations) between the parameters $\tau_i$, $p_i$ and $P_{ij}$, one for each of the two above-defined reference alignment conditions, are derivable from the conditions a), b) and c) noted above, developed from the general setting (3f) of the calculation of the flux in the teeth extended to all the teeth of the machine.

Overall, therefore, three groups of relations (equations and inequalities) are obtained which express conditions which must necessarily be satisfied by the parameters $\tau_i$, $p_i$ and $P_{ij}$.

To these three groups of relations can finally be associated other auxiliary conditions on the range of values necessary or preferable for each family of parameters, such as, for example, constraints on the maximum and minimum values of the permeances $p_i$, corresponding to constraints on the maximum and minimum radial dimensions of the air gap G, or again on the possible range of values of $P_{ij}$ compatible with the insertion of permanent magnets in the inductor B in an efficient manner, for example for the minimum overall volume of these, that is for given requirements of mechanical tightness.

Generally, the number of relations which can be thus set can however be made fewer than the number of parameters available by increasing the number n of teeth of the armature A so that the said relations can still leave a certain number of degrees of freedom for the quantitative definition of these parameters. This quantitative definition can nevertheless be effected by the designer in such a way as to be able to take account of possible further secondary requirements, such as, for example, the provision of armature structures simplified from the mechanical and magnetic point of view, or having improved structural characteristics or mechanical resistance to centrifugal forces.

Principle of Inverse Distribution of Permeance at the Air Gap in the Region of the Axis o In machines having symmetrical armature poles the application of condition a) expressed above, that is to say in the condition of "flat" variation in the maximum value of the distribution of induction or flux in the teeth, or also conditions b) and c) correlated with it, implies the necessity of introducing suitable harmonic contents in such distributions, as well as opposing, even cancelling, the phenomenon of so-called armature reaction, in particular correlated with the upper harmonics of the magnetomotive force which excite a flux intensity at the air gap of maximum value in the region of the or each pole separation axis o.

In contrast to what is known from the prior art, according to which the maximum magnetic permeance is localised at the axis o, for the purpose of reducing this armature reaction in symmetrical pole machines, and to satisfy conditions a), b) and c) expressed above, it is convenient that the distribution of values of magnetic permeance $p_i$ at the air gap G associated with armature samples has a local minimum in correspondence with the or each pole separation axis o of the armature, or rather that the values of magnetic permeance $p_i$ at the air gap increase in both directions starting from the or each armature pole separation axis, this magnetic permeance $p_i$ having its absolute maximum value in correspondence with armature samples lying between the or each said armature pole separation axis and the adjacent axis of symmetry m of the armature poles.

Hereinafter the satisfaction of this principle in the distribution of values of permeance will generally be referred to as "condition d)".

The position of the said absolute maximum value of permeance can however be tied to the particular structure of the machine, or it can be optimised on the basis of overall inductance values $L_o$ and $L_m$ for the specific application, or again can be determined, in a real machine with a finite number n of teeth, in relation to the choice of the number of bodies of which the armature is formed.

Examples of Machines with Symmetrical Armature Poles

Some examples of machines with symmetrical armature poles will now be taken into consideration with reference to specific values of n.

Figure 6:
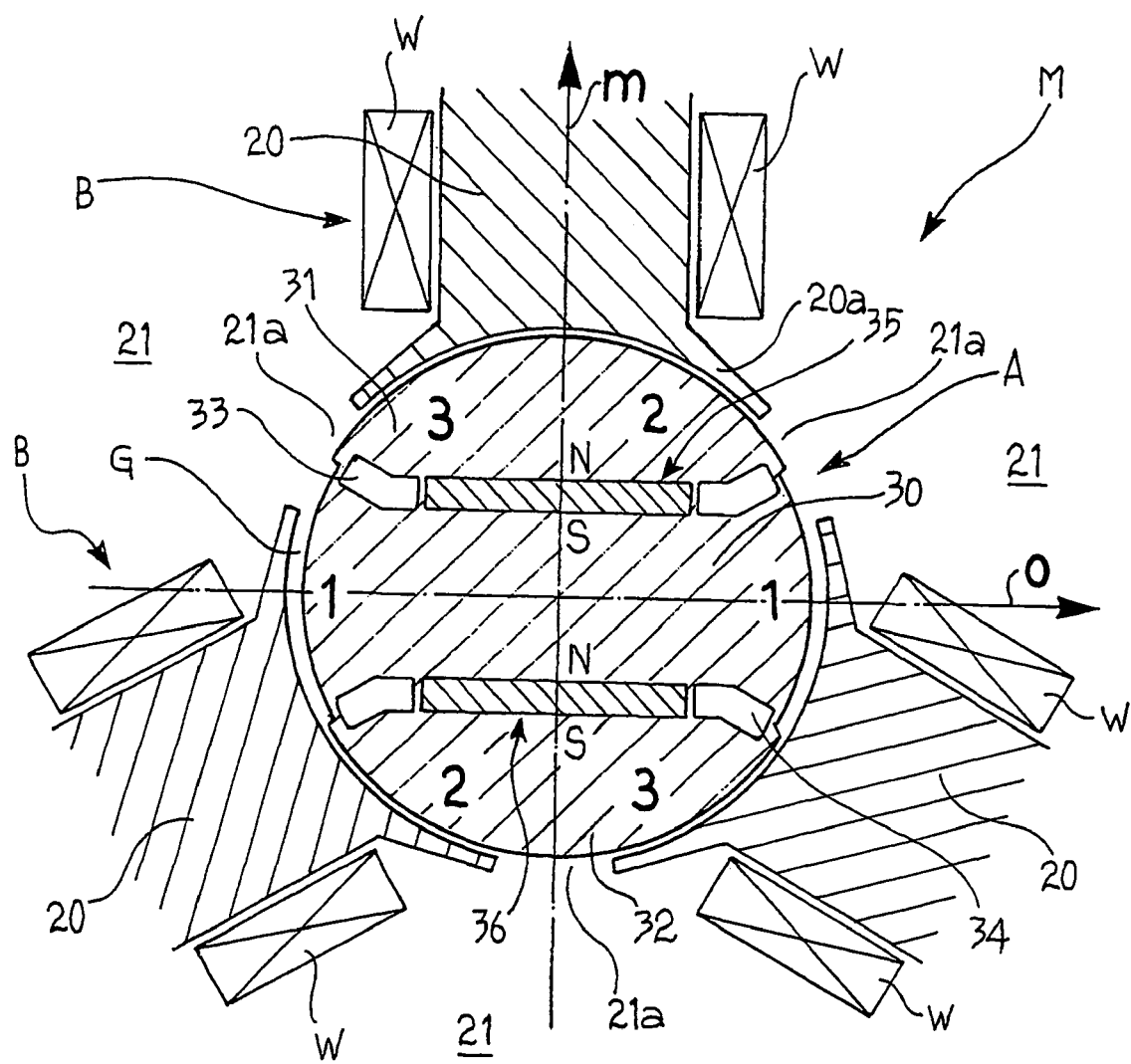
FIG. 6 is a sectioned partial view of a synchronous electric machine according to the invention, having n=3 slots and a pair of armature poles.

The simplest possible machine is obtained with n=3, for example as shown in FIG. 6. This machine according to the invention has in general good characteristics from the point of view of the reduction of cogging torque, although a high flux ripple is present in the ferromagnetic bodies of the armature, and a considerable torque ripple. Given the modest possibility of controlling the induction in the teeth of the armature upon variation in the relative position of the armature and the inductor, as well as the low utilisation of currents in the windings for the generation of useful magnetomotive force, the machine with n=3 is in general not considered particularly interesting other than for applications with low torque and short axial length.

The armature A of the machine shown in FIG. 6 has its surface facing the air gap divided into 2n=6 elements or samples. These samples are divided into two groups of n=3 samples numbered from 1 to 3. The armature A comprises three bodies of ferromagnetic material indicated 30, 31 and 32, separated by spaces 33 and 34 in which are disposed respective permanent magnets 35 and 36 magnetised parallel to the axis m, that is to say having the magnetic polarities indicated by the letters N and S.

The central body 30 of the armature A couples together the two armature samples distinguished by the numbers 1, and has magnetic potential $\tau_i=0$.

As will be appreciated from FIG. 6, the air gap G does not in general have a constant radial dimension. The end faces of the teeth 20 of the inductor B lie in fact essentially on the same cylindrical surface. However, the surface of the armature A is not cylindrical in that the individual samples of the armature are associated with respective total magnetic permeances $p_i$ in general not equal to one another.

In the specific example of the machine shown in FIG. 6, the magnetic permeance $p_1$ associated with the samples indicated with 1 is less than the magnetic permeances $p_2$ and $p_3$ associated with the samples 2 and 3, which, however, are equal to one another in application of the equation (1). The magnetic permeance associated with the samples 1 is the minimum, to satisfy condition d).

Machines with n odd and different from 3 do not have any particular practical interest because of the low compatibility with three-phase machines and the difficulty of producing simple and efficient distributions of inductor windings.

Solutions with n even and different from a multiple of 3 (for example n=4, 8, 10 . . . ) are not in general investigated for power applications in that they allow the production of two-phase machines for particular applications.

For three-phase machines the maximum interest is, on the other hand, aroused by machines with n=6 for which the maximum inductor efficiency is theoretically available.

Figure 7:
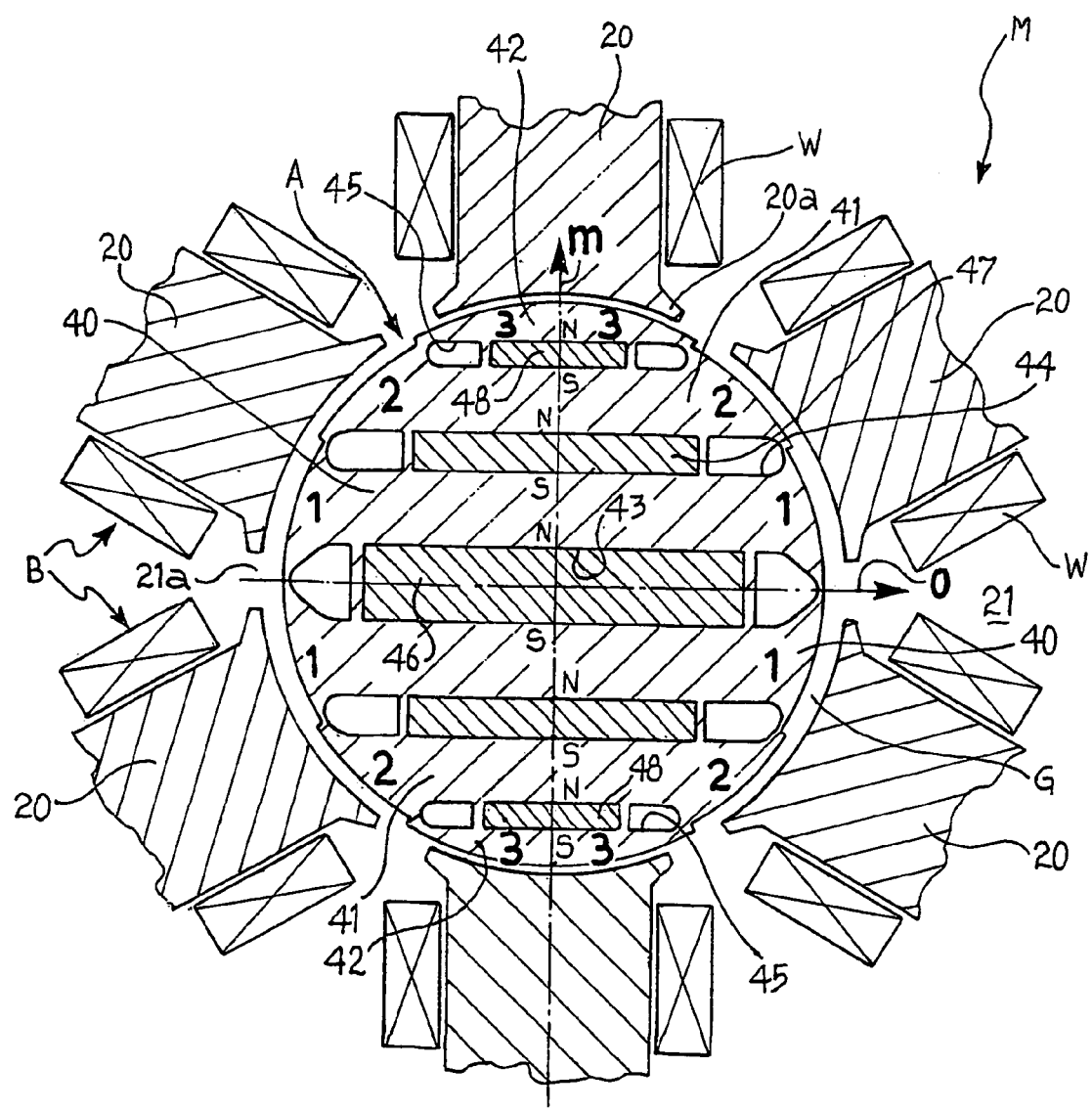
FIG. 7 is a partial view in transverse section of a synchronous machine with n=6 slots and a pair of symmetrical armature poles.

A machine of this type is shown in FIG. 7 where the armature poles are necessarily symmetrical, the armature A being split up into the maximum number of layers and bodies according to the invention.

In the machine of FIG. 7 the armature A has its surface facing the air gap divided into 2n=12 elements or samples. These samples are divided into four groups of three samples numbered from 1 to 3 as a consequence of the application of equation (1). The armature A comprises six bodies of ferromagnetic material in identical pairs indicated 40, 41 and 42. The two bodies 40 adjacent the axis o are separated by a space 43 in which is suitably disposed a single central permanent magnet 46.

Further four permanent magnets, in pairs, indicated 47 and 48, are disposed in corresponding spaces 44 and 45 defined between the bodies 40 and 41 and, the bodies 41 and 42 respectively.

All the permanent magnets are magnetised parallel to the axis m, and the magnetic polarity is indicated by the letters N and S.

The surface of the armature A is not cylindrical in that the individual samples of the armature are associated with respective total magnetic permeances $p_i$ satisfying the relations defined above from the general point of view and specifically condition d).

In particular, the machine being anyway of symmetrical type, one equation is significant for the correlation of the values of the individual total permeances at the air gap:

$$(p_1+p_3)-2p_2=0.$$

By the previously-defined inverse distribution condition, "condition d", the necessity for $p_1<p_2$ is set, from which it follows that $p_2<p_3$ by applying the above equation.

To extend the control of the flux distribution up to $\pi/3$ electric and magnetic radians beyond the axis o, outside the interval between the said axis o and the axis m, within which interval this control is primarily applied, the exact application of the condition a) would imply the following ratio between the permeances involved:

$$\frac{p_2}{p_1} = \frac{4}{\sqrt{3}} - 1 \cong 1.31$$

the third permeance then being equal to $$p_3 \cong 1.24\, p_2$$

so that the ratio between the end permeances would be equal to $$\frac{p_3}{p_1} \cong 1.62.$$

In practice, dimensioning the permeances $p_i$ by applying condition a) up to the minimum value of extent equal to one half pole, that is to say $\pi/2$, and in any event applying conditions b) and c), the intermediate permeance $p_2$ being fixed, the following relations conveniently follow:

$$0.763 < \frac{p_1}{p_2} < 1 \quad 1 < \frac{p_3}{p_2} < 1.236.$$

The machine shown in FIG. 7 is that which, with n=6, has the maximum number of separate armature bodies and can therefore obtain the maximum performance notwithstanding the low number of parameters. However the most restricting problem can be the fact that, as can be seen, the armature does not have a central body with $\tau=0$. This can involve some difficulties in the mechanical assembly of the armature. Moreover, all the bodies 40–42 of the armature A face the air gap with a single sample. This involves a certain induction ripple and corresponding losses in the ferromagnetic material of the armature at high speed.

On the other hand, the winding W of the inductor B is formed with diametral turns, with maximum theoretical efficiency.

Unfortunately, it is not possible to set all the qualitative and quantitative conditions according to the invention in a machine with n=6 and a central body having $\tau=0$.

To achieve this object it is necessary to utilise a greater number of teeth.

For machines with n=12 symmetrical armature poles the system of two equations (4a) and (4b) transforms into a system comprising a first equation which correlates together only the six independent permeances $p_i$, and a second equation which correlates together the permeances $p_i$ and the internal permeances $P_{ij}$.

From the first equation it is possible to record the following simple expression of general validity:

$$(p_1-p_6)-(1+\sqrt{3})(p_2-p_5)+(2+\sqrt{3})(p_3-p_4)=0 \qquad (4d)$$

The expression of the second equation depends however on the number of separate ferromagnetic bodies of which the armature is composed, and therefore on the number of internal permeances $P_{ij}$ present.

Finally, for symmetrical pole machines with n=12 equation (4c) assumes the following formulation of general validity:

$$(1-\cos\pi/12)b_6 - (\cos\pi/12 - \sqrt{3}/2)b_5 + \left(\frac{\sqrt{3}}{2} - \frac{1}{\sqrt{2}}\right)b_4 - + \qquad (4e)$$
$$\left(\frac{1}{\sqrt{2}} - \frac{1}{2}\right)b_3 + \left(\frac{1}{2} - \cos 5\pi/12\right)b_2 - (\cos 5\pi/12)b_1 = 0$$

where $b_i = \tau_i \cdot p_i$.

Equation (4e) can thus be expressed in a more summarised form:

$$\sum_{i=1}^{6} \left\{ (-1)^{i+1} \tau_i p_i \left[ \cos\left(\frac{7-i}{12}\pi\right) - \cos\left(\frac{6-i}{12}\pi\right) \right] \right\} = 0 \qquad (4f)$$

Figure 8:
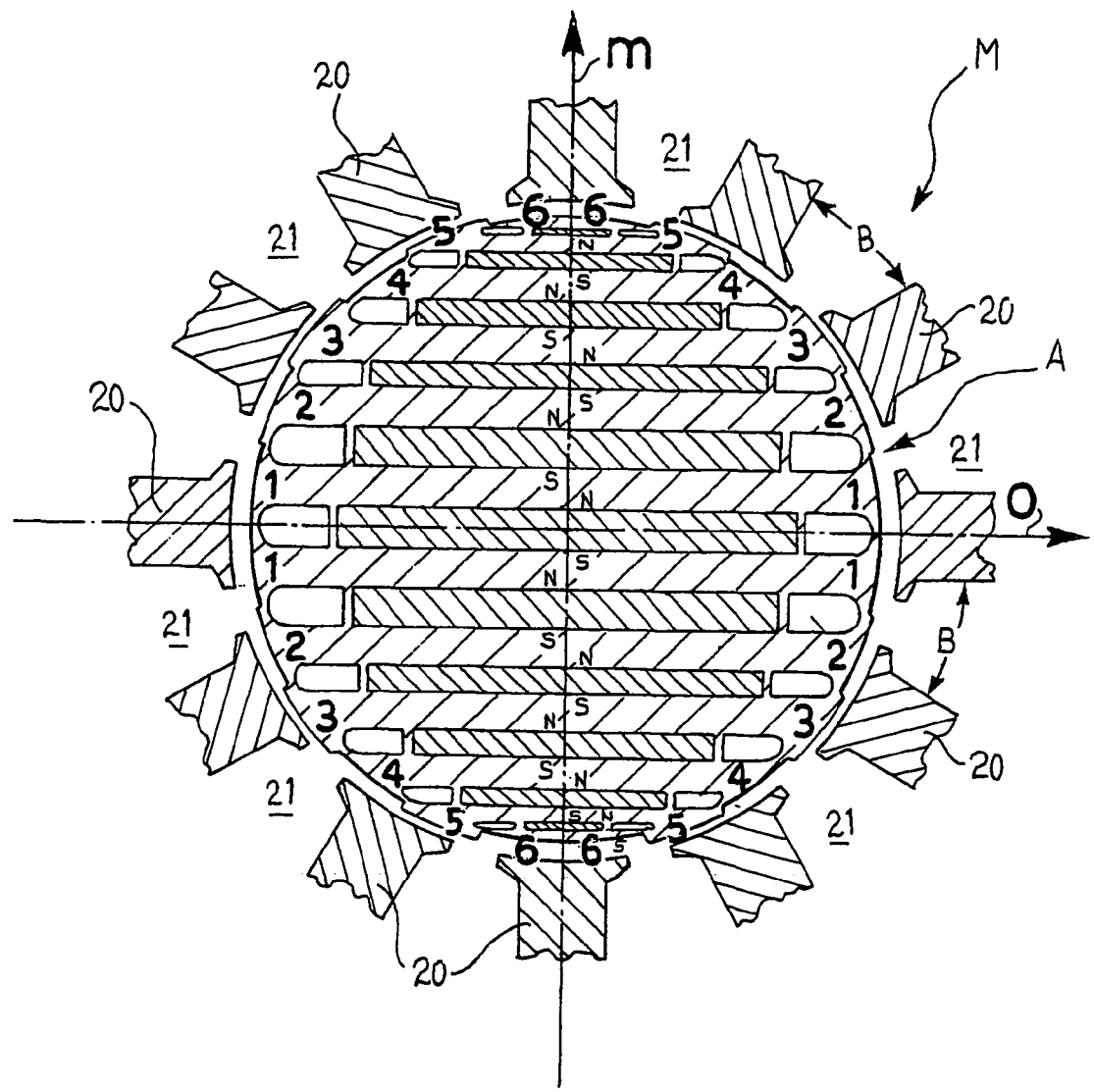

In FIG. 8 is shown an example of a synchronous machine according to the invention having symmetrical armature poles in which, for n=12 there is available the maximum number of separate armature bodies and therefore the maximum possible number of separate magnetic potentials and therefore internal magnetic permeances.

The armature A of the machine of FIG. 8 has its surface facing the air gap divided into 2n=24 elements or samples, subdivided into four groups of six samples numbered from 1 to 6. The armature A includes twelve bodies of ferromagnetic material in symmetrical pairs, separated by eleven spaces in which are disposed respective permanent magnets magnetised parallel to the axis m. These magnets essentially comprise a central magnet and other magnets in symmetrical pairs.

The machine of FIG. 8 does not have a central armature body with $\tau=0$, has a high structural complexity and a considerable induction ripple in the ferromagnetic bodies of the armature, with consequent losses at high speed. On the other hand the number of parameters $\tau_i$, $p_i$ and $P_{ij}$ available is very high so that it lends itself to satisfying very disparate functional requirements and maximum performance.

For machines with symmetrical armature poles with n=12, such as those shown in Figures from 8 to 12, the setting of previously stated conditions a) and c) to teeth of the inductor B situated in the region of the axis o of the armature A is summarised, for one sign of the torque, by the following series of inequalities:

$$\phi_{d/12} \leq \phi_{d/11} \leq \phi_{d/21}. \qquad (5)$$

The solution of these inequalities, with reference to equation (3f) and neglecting $P_o$, leads to the following correlation:

$$\frac{p_1}{p_2} \geq \frac{\cos(\pi/12)}{2-\cos(\pi/12)} \cong 0.93. \qquad (5a)$$

For symmetrical pole machines with n=12 having a central ferromagnetic armature body with $\tau=0$, such as that shown in Figures from 9 to 12, the solution of the inequalities (5) gives the following further condition:

$$\frac{|\tau_2|}{\tau_{sp}} \leq \frac{2\sin(\pi/12)}{2-\cos(\pi/12)} \cdot |\sin\gamma| \cong 0.5|\sin\gamma| \qquad (5b)$$

where $\tau_{sp}$ is the maximum value of the magnetic potential distribution produced by the inductor B; and γ is the spatial offset between the inductor current vector (that is the magnetomotive force of the desired inductor) and the axis o of separation of the armature poles.

The strict imposition of the equations expressed in the inequalities (5) above involves the strict solutions (that is to say equalisations) expressed in the inequalities (5a), and possibly (5b).

These solutions are associated with the exact application of the previously recorded condition a).

If it is not intended to achieve these exact solutions it is nevertheless useful to apply the general principle of inverse distribution of permeances expressed by condition d) defined above.

Condition d) in the case in question (n=12, FIGS. 8–12) implies at least the following inequality between the first two permeances:

$$p_1 < p_2 \tag{5c}$$

By combining relations (5a) and (5c) one obtains the following definitive intervals of values:

$$0.93 \le \frac{p_1}{p_2} < 1. \tag{5d}$$

The same condition d), extended to include the third value of permeance for symmetrical pole machines with n=12, in combination with condition a), further leads to imposition of the following inequalities on the ratio between the second and third permeance:

$$0.86 < \frac{p_2}{p_3} < 1 \tag{5e}$$

which adds to (5d) for the definition of machines having in general greater defluxability to the detriment of torque density.

Figure 9:
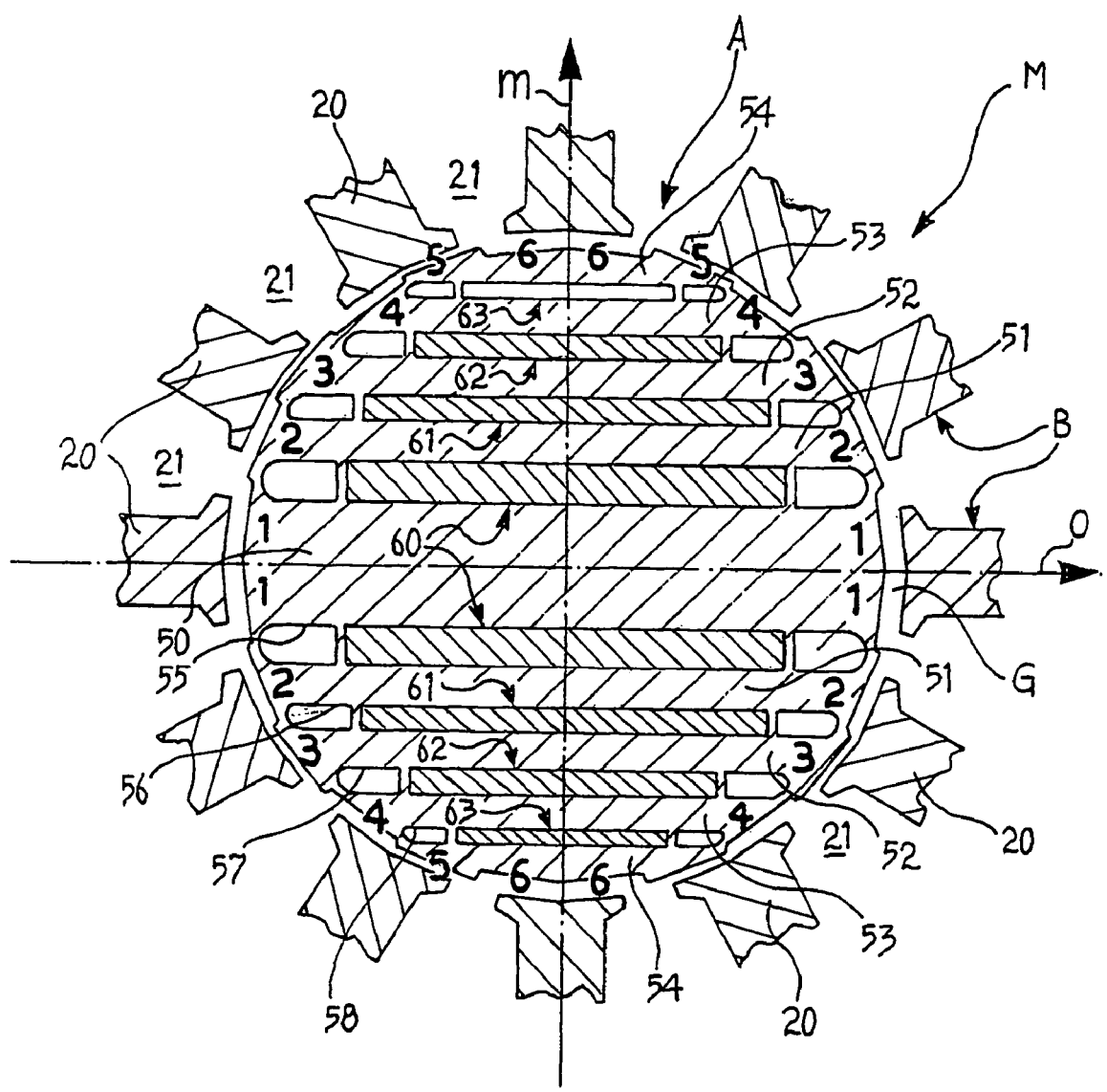

In the machine of FIG. 9 (a synchronous machine with symmetrical armature poles, with n=12) the surface of the armature A facing the air gap G is divided into 2n=24 elements or samples, subdivided into four groups of six samples numbered from 1 to 6. The armature A comprises a central body 50 of ferromagnetic material of magnetic potential τ=0. The presence of a central ferromagnetic body is advantageous from the mechanical point of view in that this body lends itself well to coupling of the armature A to a shaft.

The armature A of the machine of FIG. 9 then comprises further eight bodies of ferromagnetic material equal in pairs indicated with the numbers 51–54. Between the ferromagnetic bodies of the armature are defined eight spaces, equal in pairs, indicated 55–58, in which are disposed respective magnets 60–63 equal in pairs.

With respect to the machine shown in FIG. 8, the machine of FIG. 9 has a lesser structural complexity, the advantage of a central ferromagnetic body in the armature, and reduced armature losses. This compares with a reduction in the available degrees of freedom in definition of the characteristics of the machine which nevertheless remain still rather high.

Still with reference to FIG. 9, in cases in which it is intended to apply equations (5d) and (5e) to obtain a machine with better defluxability and capacity for drastically limiting the so-called short-circuit current, that is to say the current which flows in the winding in correspondence with the three-phase short-circuit at high speed, it is possible to obtain a particular reduction in complexity by eliminating the magnets 61 positioned between the bodies 51 and 52, suitably dimensioning the mechanical and magnetic connections between these bodies. In fact, the application of (5a) in a strict sense and the resultant potential $\tau_2$ given by (5b), in combination with the extension of (5) to the fluxes $\phi_{d/32}$ e $\phi_{d/23}$, gives the following result:

$$|\tau_3| < |\tau_2| \tag{5f}$$

in addition to the application of (5e) which makes possible the elimination of magnets 61 whilst still applying conditions a) and c).

With some partial departure from the conditions of quadrature b) and monotonicity c) it is likewise possible also to eliminate the magnets 63 between the bodies 53 and 54.

Figure 10:
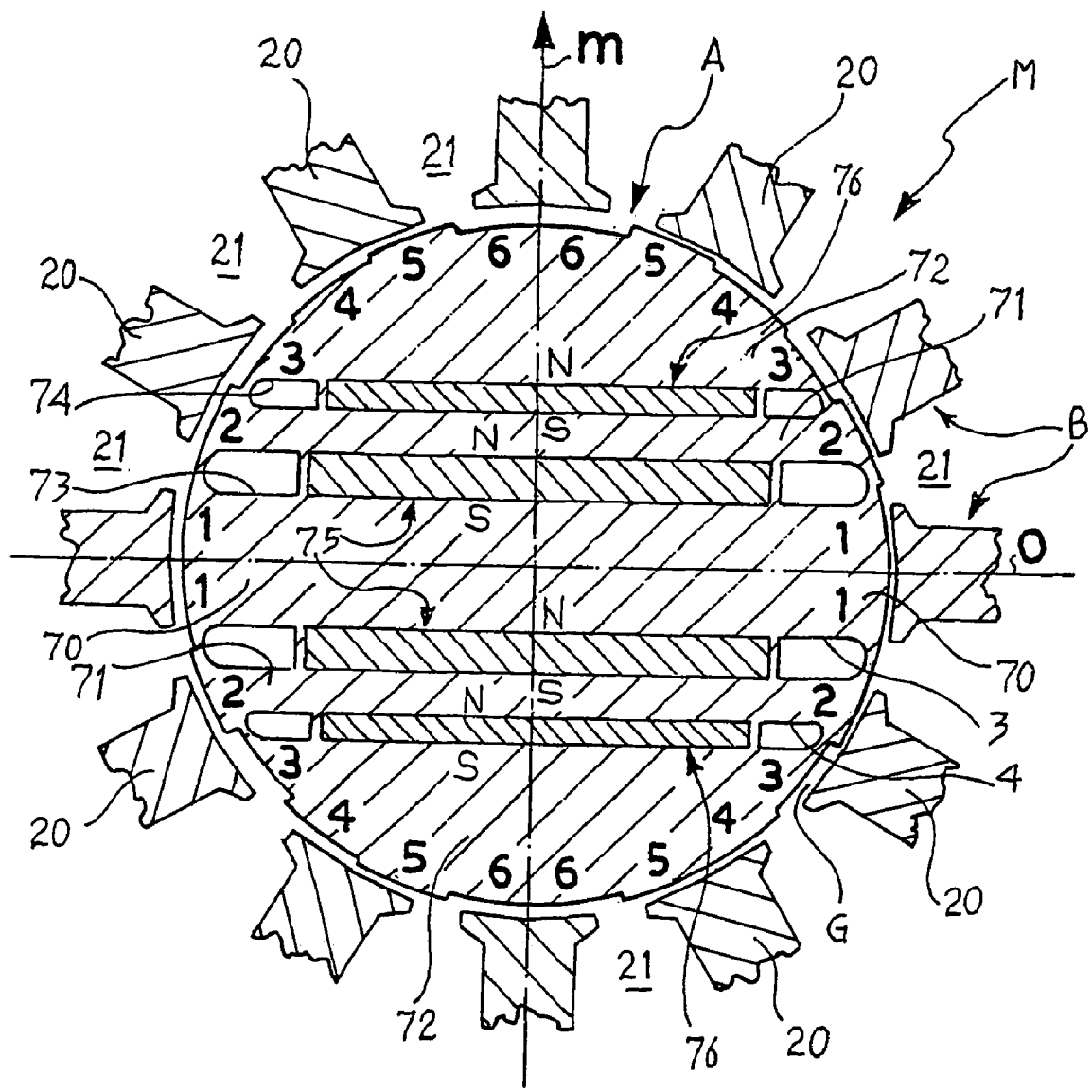

In FIG. 10 there is shown a further synchronous machine with symmetrical armature poles with these n=12. This machine, like that just considered, has an armature with a central body 70 of ferromagnetic material of magnetic potential τ=0. The armature A comprises further four bodies of ferromagnetic material in pairs of identical bodies indicated 71 and 72. Between the armature bodies are defined four spaces, in pairs of equal spaces, indicated 73 and 74, in which are housed respective permanent magnets also in pairs of identical magnets indicated 75 and 76.

The machine shown in FIG. 10 represents a possible solution of the optimum synchronous machine. In effect it has a relatively simple structure, the advantage of a central ferromagnetic body in the armature, very modest armature losses, and a small number of permanent magnets. The number of available parameters remains however sufficiently high to satisfy the functional requirements and achieve the maximum torque density (or force).

By setting the constraints relating to the armature structure shown in FIG. 10, the equation (4d) remains unaltered in that it is independent of the armature structure; the following equation is associated with it, which involves the internal permeances, thus providing the complete solution of the system of two general equations (4a) and (4b):

$$P_{10} = p_2 \frac{p_2(P_{12} + p_3 + p_4 + p_5 + p_6)\left[\frac{1}{4} - \cos^2\left(\frac{5}{12}\pi\right)\right] + P_{12}\left[F5 - 2\cos\left(\frac{5}{12}\pi\right)\right]}{(F0^2 - F5^2)} - P_{12} - p_2$$

where:

$P_{10}$ is the magnetic permeance between the layer of null magnetic potential (numbered 0) and the subsequent layer (numbered 1), $P_{12}$ is the magnetic permeance between the layer 1 and the subsequent layer (numbered 2), F0 is the parameter having the following expression:

$$F0 = \left[(p_3 + p_4)\cos\left(\frac{\pi}{4}\right) + (p_5 + p_6)\cos\left(\frac{\pi}{12}\right)\right],$$

F5 is a parameter having the following expression:

$$F5 = \left[p_3\cos\left(\frac{\pi}{3}\right) + (p_4 + p_5)\cos\left(\frac{\pi}{6}\right) + p_6\right].$$

Finally, equation (4e) derived from (4c) can be developed as follows:

$$\tau_{3-6}\left[\left(1-\cos\frac{\pi}{12}\right)p_6 - \left(\cos\frac{\pi}{12} - \frac{\sqrt{3}}{2}\right)p_5 + \left(\frac{\sqrt{3}}{2} - \frac{\sqrt{2}}{2}\right)p_4 - \left(\frac{\sqrt{2}}{2} - \frac{1}{2}\right)p_3\right] + \tau_2\left(\frac{1}{2} - \cos\frac{5\pi}{12}\right)p_2 = 0$$

where:

$\tau_{3-6}$ represents the common magnetic potential of samples 3, 4, 5, 6.

The application to this machine of conditions a), b), c) extended in the sense of obtaining the maximum torque density performance finally requires that the distribution of permeances $p_3$, $p_4$, $p_5$ satisfies the following system of inequalities:

$p_5 > p_4 > p_3$ and, $p_2$ and $p_1$ being determined according to condition d), $p_6$ results from the imposition of equation (4d).

In general $p_6$ is very much less than the maximum values represented by $p_2$ or $p_5$, so that the control of the magnetic induction in the teeth is possible effectively in correspondence with seven armature samples, equivalent to $7/12$ of the pole pitch on either side of the axis o, of which five on one side (numbered 1, 2, 3, 4, 5 in FIG. 10, starting from axis o and proceeding in one sense) and two from the opposite side (starting from axis o and proceeding in the other sense to cover the samples 1 and 2 in FIG. 10).

Similar considerations are valid for the machine shown in FIG. 11, which is again of the type with n=12. This machine differs from that of FIG. 10 essentially by the fact that the armature A has an additional pair of bodies, that is to say in addition to the central ferromagnetic body 80, six ferromagnetic bodies in pairs of equal bodies, from 81 to 83. Between the armature bodies are defined six spaces 84–86 in three pairs of equal spaces, in which are housed respective permanent magnets 87–89 also in three pairs of equal magnets.

Figure 11:
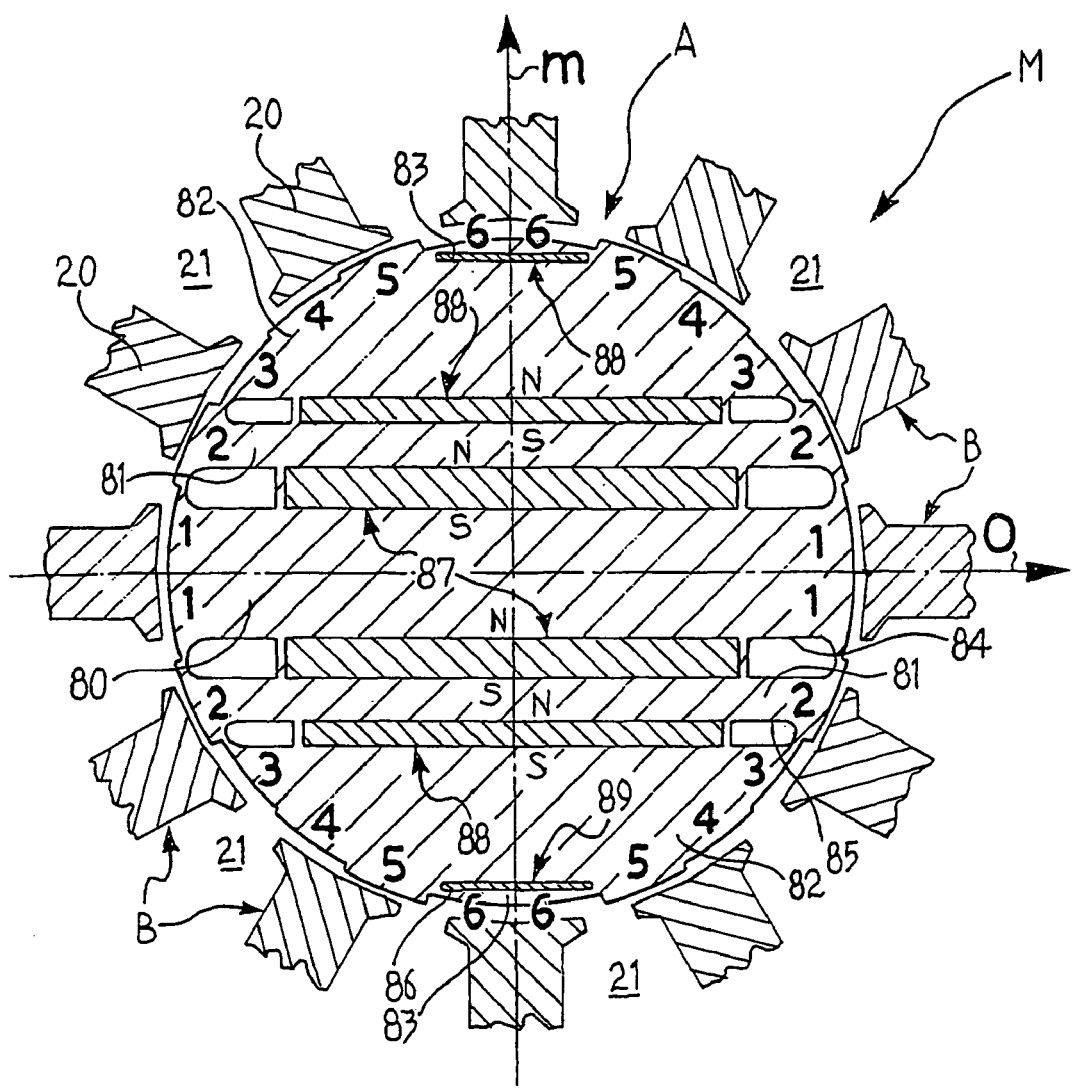

With respect to the machine previously considered, the machine of FIG. 11 has a slightly more complex structure, a higher number of armature bodies and permanent magnets, and a correspondingly higher number of degrees of freedom in the definition of its characteristics.

In this machine configuration each magnet 89 has the function of extending, with respect to the configuration of the machine of FIG. 10 described above, the dominance or control of the induction also to one of the two samples 6 adjacent to the axis m.

In this way the dominance or control of the induction, as expressed by the principle or condition a), can extend to eight samples, numbered from 1, 2, 3, 4, 5, 6 in FIG. 11 starting from axis o proceeding in one sense, and 1, 2 starting from the axis o proceeding in the opposite sense, this extent corresponding overall to ⅔ of the whole pitch.

Moreover, since the air gap permeance $p_6$ is discretely less than the maximum air gap permeance, represented by $p_2$ or $p_5$, the dominance of the induction according to condition a) in non-strict form, and in any case according to condition c), extends in practice up to nine samples (7+2), comprising in practice both the samples 6 adjacent to the axis m; this extent corresponds approximately to ¾ of the pole pitch.

In other applications, the maximum torque density cannot be given priority in favour of other characteristics such as the power density, that is to say the efficiency at high speed, or the so-called defluxability, that is the possibility of supplying the machine at constant voltage and power over a given speed interval of relative movement between inductor and armature.

In such cases reduction in the torque density, or rather the application of conditions a) and b) in a minimum and non-strict manner offers further degrees of freedom to increase efficiency and defluxability.

Figure 12:
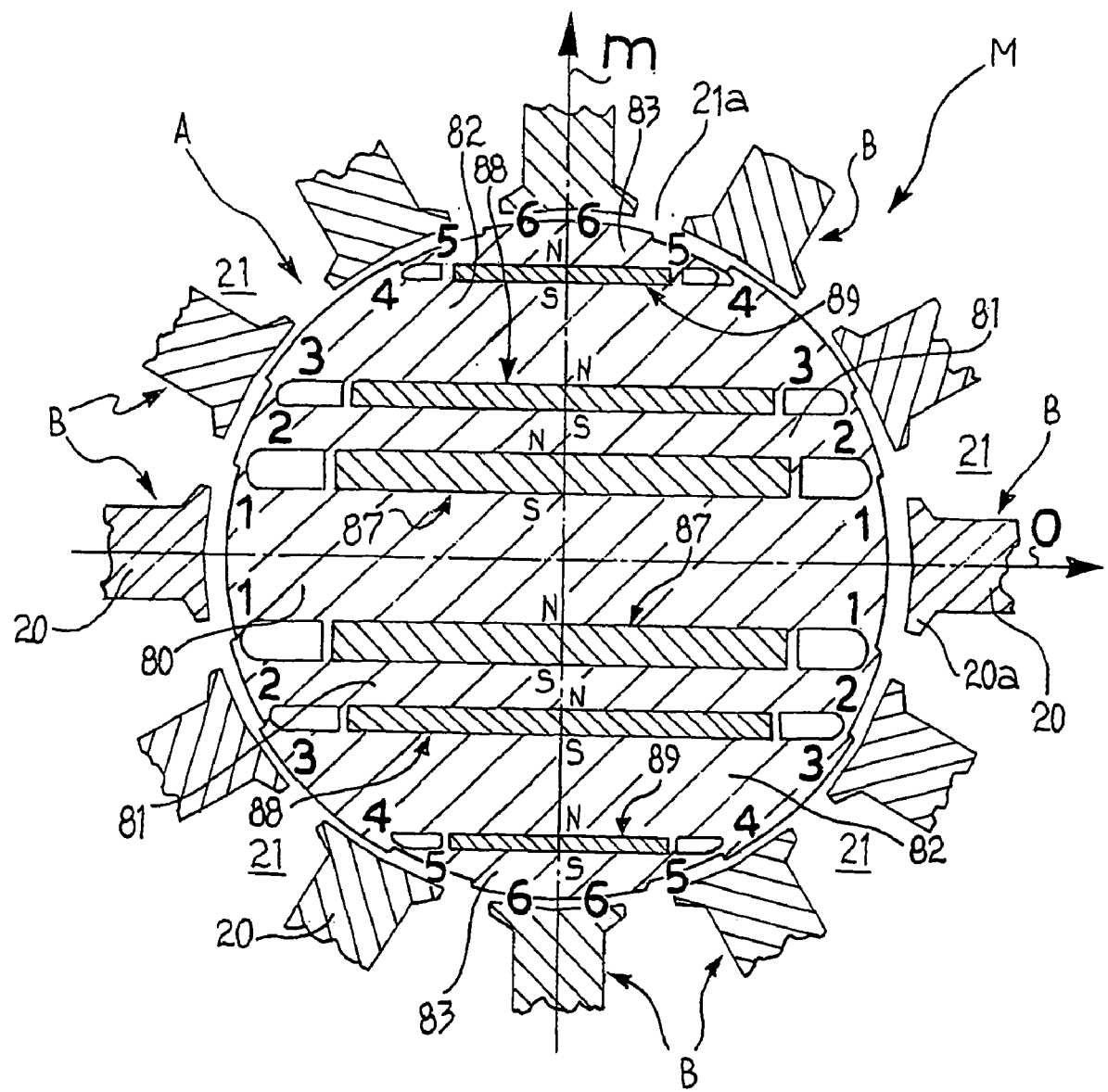

For example, in FIG. 12 is shown a structure again having a central body 80 with $\tau=0$ obtained by combining the bodies which face the air gap with the samples 1, as well as the two so-called "even" bodies 82 obtained by combining the samples 3 and 4, and the two "even" bodies 83 obtained by combining the samples 5 and 6. All these bodies have low losses in the ferromagnetic material of which they are formed. The only "odd" bodies necessary and sufficient according to the invention are the bodies 81 which face the air gap with the samples 2.

Machines with n greater than 12 are in general of little interest in that the armature is constructionally complex and inefficient for the conversion of the currents into m.m.f. in the inductor; however they allow a further increase in the design freedom which can be managed in a manner strictly analogous to that indicated for machines with n=12.

Machines with Asymmetrical Armature Poles

Machines with asymmetrical armature poles will now be considered, that are suitable for any number of asymmetric applications in terms of torque (or force) required, in the limit required with a single sign or required with stringent specifications relating to a single sign of the torque (or force).

For this category of machines all the relations (3a–3e) previously reported are valid, all the parameters appearing there being in general different from zero, for which there are two conditions in addition to those imposed on machines with symmetrical pole armatures.

In general the system of three equations 3a), 3b) and 3c) can be conveniently transformed into a system of three equations in two of which the individual air gap permeances $p_i$ appear, whilst in the third the internal permeances $P_{ij}$ also appear.

For these machines the induction conditions a), b) and c) previously recorded are also valid as well as the five relations (3a–3e), applied, however, to the torque of single sign required or specified for the best performance.

In each case, the asymmetry involves the fact that the total independent magnetic permeances $p_i$ are equal in number to n.

Overall, for machines with asymmetric armature poles the parameters $\tau_i$, $p_i$ and $P_{ij}$ are therefore more numerous, but subject also to a higher number of conditions than in symmetric pole machines. There is in general more design freedom, which can be conveniently utilised for example to achieve reductions in cost and/or improved performance.

Some examples will now be seen.

In FIG. 13 is exemplified a synchronous machine having asymmetric armature poles, which is very simple in that it has only n=6 teeth and slots and a central body with $\tau=0$.

The periphery of the armature A is divided into 2n=12 samples, split into two groups of six samples each, numbered from 1 to 6.

The armature A is characterised by a central body 90 having magnetic potential τ=0 extending well over 60 magnetic degrees at each end. Further four bodies of ferromagnetic material, in two pairs of equal bodies 91 and 92, are formed in such a way as to satisfy the conditions expressed in claims 2 and 3, so that $p_2=p_5$ and $p_4=p_3$ in application of equation (1).

Between the bodies of ferromagnetic material of the armature A are therefore defined four spaces, in pairs of equal spaces, indicated 93a and 93b, in which are housed respective permanent magnets, also in pairs of identical magnets indicated 94 and 95.

Asymmetric armature pole machines with n=12 are particularly interesting in that they make it possible also to form as many simple armatures as those which are obtained for n=6, thereby conveniently increasing the number of degrees of freedom.

In general, for n=12, the system of equations from 3a) and 3c) can be re-expressed as a system composed of two equations comprising the individual $p_i$ as follows:

$$[(p_1+p_{12})-(p_6+p_7)]-(1+\sqrt{3})[(p_2+p_{11})-(p_5+p_8)]+ \\ (2+\sqrt{3})[(p_3+p_{10})-(p_4+p_9)]=0 \quad (6a)$$

$$[(p_1-p_{12})+(p_6-p_7)]-(\sqrt{3}-1)[(p_2-p_{11})+(p_5-p_8)]+ \\ (2-\sqrt{3})[(p_3-p_{10})-(p_4-p_9)]=0 \quad (6b)$$

as well as a third equation also correlating the $P_{ij}$ which necessarily depends, as previously mentioned, on the number of magnetically distinct bodies into which the armature is divided.

Equations 3d) and 3e), moreover, having defined:

$$b_i = \tau_i p_i;$$

are re-expressed as follows:

$$\sin\left(\frac{\pi}{12}\right)(b_6 - b_7) + \left[\sin\left(\frac{\pi}{12}\right) - \frac{1}{2}\right](b_5 - b_8) + \left[\frac{\sqrt{2}}{2} - \frac{1}{2}\right](b_4 - b_9) + \\ + \left[\frac{\sqrt{2}}{2} - \frac{\sqrt{3}}{2}\right](b_3 - b_{10}) + \left[\cos\left(\frac{\pi}{12}\right) - \frac{\sqrt{3}}{2}\right](b_2 - b_{11}) + \left[\cos\left(\frac{\pi}{12}\right) - 1\right](b_1 - b_{12}) = 0 \quad (6c)$$

$$\left[1 - \cos\left(\frac{\pi}{12}\right)\right](b_6 + b_7) + \left[\frac{\sqrt{3}}{2} - \cos\left(\frac{\pi}{12}\right)\right](b_5 + b_8) + \left[\frac{\sqrt{3}}{2} - \frac{\sqrt{2}}{2}\right](b_4 + b_9) + \\ + \left[\frac{1}{2} - \frac{\sqrt{2}}{2}\right](b_3 + b_{10}) + \left[1 - \text{sen}\left(\frac{\pi}{12}\right)\right](b_2 + b_{11}) - \text{sen}\left(\frac{\pi}{12}\right)(b_1 + b_{12}) = 0 \quad (6d)$$

In FIG. 14 is shown a machine M having asymmetrical armature poles with n=12. The periphery of the armature A of this machine comprises 24 samples, divided into two groups of twelve numbered from 1 to 12.

The armature A comprises a central body of ferromagnetic material 100 which at each of its ends has an angular extent equal to four samples. The armature A further includes another four ferromagnetic bodies in pairs of identical bodies indicated 101 and 102.

Between the ferromagnetic bodies of the armature A are defined four spaces, in pairs of equal spaces 103 and 104, in which are located respective magnets, also in pairs of identical magnets 105 and 106.

The machine shown in FIG. 14 has almost optimum characteristics: high mechanical robustness, low losses, small number of parts and in particular permanent magnets, easy connection to a shaft, high number of degrees of design freedom, maintaining moreover a good functionality even in relation to the torque sense opposite that of the design sense.

In FIG. 15 there is shown another embodiment of a synchronous machine having asymmetric armature poles with n=12, characterised by more sharply asymmetric performance. In this Figure, the parts and elements essentially corresponding to those of the machine of FIG. 14 have again been allocated the same reference numerals.

In the machine according to FIG. 15 the central τ=0 body 100 of the armature A extends over four samples at each end. The outer ferromagnetic bodies 102 have an extent of four samples each, rather than six as in the machine of FIG. 14. Moreover, the intermediate ferromagnetic bodies 101 extend over a single sample at one end and over three samples at the other end.

The machine of FIG. 15 also has essentially the same advantageous characteristics explained above in relation to the machine of FIG. 14, however with details of construction and application which can make it preferable.

Arrangements on the Inductor for the Cancellation of "Subharmonic" Ripple

In general, in machines with n=12, with symmetrical or asymmetrical armature poles, the cancellation of ripple of period 2P (P being the slot pitch) of the magnetic parameters along the direction of relative movement between the inductor and armature is achieved by forming the slots in the inductor B in such a way that they have a differentiated form as will be described now with reference to FIGS. 16, 17 and 18.

In FIG. 16 there is shown a linearised portion of the inductor B with two adjacent slots 21' and 21" having different widths b' and b". These slots lie between teeth 20 having essentially identical dimensions and specular shape with respect to the centre line of the slot, and in any event having respective pole shoes 20a facing the air gap which have the same extent in the direction of relative displacement between the inductor and the armature. The mouths 21a of the slots 21' and 21" also have the same extent along the said direction of relative displacement.

Conveniently, to obtain a substantial cancellation of the ripple and at the same time a maximum efficiency of the machine, the slots of the inductor B have alternating widths which relate to one another substantially in the ratio √3/2, like the widths indicated b' and b" in FIG. 16.

FIG. 17 shows a linearised inductor formed with slots having different widths as described above.

FIG. 18 shows conventionally the distribution of conductors in the winding of one phase of the inductor B in a three-phase synchronous motor according to the invention, designed to obtain maximum performance. This Figure shows, along the ordinate, the m.m.f. produced by one of the three phases, the variations of which are correlated with the number of conductors disposed in the slots, as a function of the position co-ordinate (along the direction of relative displacement between inductor and armature) plotted on the abscissa, and referred to the linearised portion of the inductor shown in FIG. 17.

In each "narrow" slot 21' of the inductor, having width b', are housed √3z conductors of one phase, z conductors of the same phase being lodged in the two contiguous "wide" slots 21" having width b". The slots 21" are widened in that they must also receive z conductors of another of the three phases. Insulation between the phases can require that b" be in practice slightly greater than 2b'/√3, whilst the insulation in relation to the teeth reduces this increment.

The absence of so-called "sub-harmonics" (period 2P) of this distribution of conductors can be deduced, among other things, from the cancellation of the so-called "bight" of fifth and seventh harmonic of the phase distribution. The width $Z_h$ of the "hth" harmonic being described by:

$$Z_h = \frac{4}{\pi} z \left[ \frac{\sqrt{3}}{2} + \cosh\frac{\pi}{6} \right] \frac{1}{h}$$

∀h odd, it can be noted that for h=5,7 $Z_5=Z_7=0$.

The fundamental component on the other hand is $$Z_1 = \frac{4}{\pi} \sqrt{3} z$$

so that the relationship between fundamental amplitude and maximum value of the conductor distribution is $$\frac{Z_1}{\left(1+\frac{\sqrt{3}}{2}\right)z} = \frac{4}{\pi}\frac{2\sqrt{3}}{2+\sqrt{3}} = \frac{4}{\pi}2\sqrt{3}(2-\sqrt{3}) = \frac{4}{\pi}0.9282$$

By comparison, and as known, starting from the usual distribution of shortened pitch conductors in which two identical contiguous slots house z conductors of one phase, by inserting a number kz of conductors in the two slots contiguous to the first two it is possible to cancel the bight of fifth and seventh harmonic.

This transition of the conductor distribution is also known as (1, 3, 3, 1) in that the harmonic content of the transition (kz, z, z, kz) is described analytically thus:

$$Z'_h = \frac{4}{\pi} z \left[ \cosh\frac{\pi}{12} + k\cosh\frac{\pi}{4} \right] \frac{1}{h}$$

∀h odd for which the bight of fifth and seventh cancels for k=0.3660, that is to say $$\frac{\sqrt{3}-1}{2},$$

a number which in practice is well approximated by ⅓. However, the relationship between the fundamental amplitude and the maximum amplitude of the conductor distribution gives $$\frac{Z'_1}{z(1+0.366)} = \frac{4}{\pi} \frac{\cos\frac{\pi}{12}+\frac{1}{2}(\sqrt{3}-1)\cos\frac{\pi}{4}}{1+\frac{1}{2}(\sqrt{3}-1)} = \frac{4}{\pi}0.8965$$

In summary, by making the inductor in accordance with the invention it is possible to increase by 3.5% the coefficient of conversion of the current to m.m.f., or rather to reduce by about 7% the copper losses for the same fundamental m.m.f. produced.

The transition of the distribution of conductors according to the invention can be described in principle by the sequence (1, √3, 1). Various integer numbers are able to approximate it with good accuracy, the smallest integer number common factor being equal to 3, obtaining in this case the approximated sequence (3, 5, 3). Other sequences are obviously obtainable with larger whole or integer numbers, including (4, 7, 4), (7, 12, 7), (8, 13, 8), (11, 19, 11) etc. being particularly accurate.

Naturally, the principle of the invention remaining the same, the embodiments and details of construction can be widely varied with respect to what has been described and illustrated purely by way of non-limitative example without by this departing from the ambit of the invention as defined in the annexed claims.

The invention claimed is:

1. A synchronous electric machine (M) comprising an armature (A) and an inductor (B), between which is defined an air gap (G);
   the armature (A) having at least one pair of poles (N, S),
   the inductor (B) having, for each pair of poles (N, S) of the armature (A), n teeth (20) and n slots (21) alternating with one another and having at the air gap (G) respective essentially constant extent in the direction of relative displacement between the inductor (B) and the armature (A); the inductor (B) being provided with a winding (W);
   the surface of the armature (A) facing the air gap (G) being divided into 2n elements or samples (1–12) for each pair of poles of the armature having substantially the same extent in the said direction of relative displacement; each sample (1–12) having a respective value of magnetic potential ($\tau_1$);
   each sample (1–12) of the armature (A) being associated with a respective value of total magnetic permeance (pi) at the air gap (G) in a predetermined alignment condition or relative position between the inductor (B) and the armature (A) in which the sample extends between the centre line of the opening (21*a*) of one slot (21) and the centre line of the end or pole shoe (20*a*) of a tooth at the air gap (G); the value of the total magnetic permeance (pI) associated with at least two samples being different from the value of the total magnetic permeance associated with the other samples;

the armature (A) comprising a plurality of bodies (30, 31, 32; . . . ) of magnetically distinct ferromagnetic material, each of which couples at least two armature samples in such a way as to ensure a substantial magnetic equipotentiality thereof;

the magnetic potentials ($\tau_i$) of the individual samples (1–12) of the armature (A) and the said values of total magnetic permeance ($p_i$) associated with them being determined according to predetermined criteria;

characterized in that the value of magnetic potential ($\tau_i$) of each sample (1–12) is essentaily constant over the extent of the sample in that the inductor (B) is formed in such a way that it is able to generate a magnetomotive force distribution which is seen by the armature (A) identically in all the relative positions spaced from one another by one slot pitch (P), and in that, having defined a first and a second alignment conditions for each sample (1–12), in the first of which the sample (1–12) extends in a given directional sense from the centre line of the opening (21a) of one slot (21) to the air gap (G) and the centre line of the end (20a) of one tooth (20) at the air gap (G), and in the second of which the sample extends from the centre line of the end (20a) of one tooth (20) at the air gap (G) to the centre line of the opening (21a) of a slot (20) to the air gap (G), the values of all the magnetic parameters ($L_o$, $L_m$, $L_{om}$, $\psi_o$, $\psi_m$) of the electric machine calculated in the components along two separate axes ($\varrho$, m), for example at right angles to one another, related to the armature, are substantially equal to one another in the said two alignment conditions.

2. An electric machine according to claim 1, in which, the samples (1–12) of the armature being assigned respective even and odd positions alternately on the surface facing the air gap (G) along the said direction of relative displacement, for each body (31, 32; . . . ; 101, 102) of the armature (A) having magnetic potential ($\tau$) substantially different from zero the sum of the total magnetic permeances ($p_x$) of the samples of even position is substantially equal to the sum of the integral magnetic permeances ($p_y$) of the samples in odd positions.

3. An electric machine according to claim 1, in which the armature (A) comprises at least one ferromagnetic body, defined "odd" (30; 40; 51; . . . ; 101), which faces the air gap (G) through two non-contiguous sets of samples, each of which comprises an odd number of contiguous samples (1).

4. An electric machine according to claim 3, in which the armature (A), starting from the central body (50), comprises three contiguous "odd" bodies or layers (51–53) for each pole.

5. An electric machine according to claim 3, in which the armature (A) comprises for each pole a single odd body (71), contiguous with the central body (70) and which faces the air gap (G) with a single sample (2) at each of its ends, and a single further body (72).

6. An electric machine according to claim 5, in which the surface of the armature (A) facing the air gap (G) is divided into four groups of six samples (1–6) and, being $p_1$, $p_2, \ldots, p_6$ the values of the magnetic permeance associated with the samples (1–6) of each group starting from the pole separation axis ($\varrho$) of the armature poles, one has that $p_1 < p_2$; $p_3 < p_4 < p_5$; and $p_6 < \max (p_2, p_5)$.

7. An electric machine according to claim 3, in which the armature (A), in each pole starting from the central body (80), comprises a first odd body (81) which faces the air gap (G) with a single sample (2) at each of its ends, and a second odd body (82) which is contiguous with the first (81) and which faces the air gap (G) with three samples (3, 4, 5) at each of its ends.

8. An electric machine according to claim 3, in which the armature (A) comprises for each pole a single odd body (81) contiguous with the central body (80) and which faces the air gap (G) with a single sample (2) at each of its ends, and two further bodies (82, 83) neither of which is odd.

9. An electric machine according to claim 3, in which n=12 and the armature (A) comprises a central body (100) of ferromagnetic material of zero magnetic potential, the opposite ends of which each form four samples (1, 2, 11, 12), and four further bodies or layers (101, 102) in pairs of identical bodies or layers; between the bodies (100–102) of the armature (A) there being defined four spaces (103, 104) in which are located respective permanent magnets (105, 106) magnetised orthogonally of the pole separation axis ($\varrho$) of the armature poles (A).

10. An electric machine according to claim 9, in which the outermost bodies or layers (102) of the armature (A) each comprise six contiguous samples (4–9).

11. An electric machine according to claim 9, in which the intermediate bodies (101) of the armature (A) comprise three samples (3–5) at one end, and one sample (10) at the other end; the outermost bodies or layers (102) then each comprising four contiguous samples (6–9).

12. An electric machine according to claim 1, in which:

$L_{o,1} \cong L_{o,2}$ $L_{m,1} \cong L_{m,2}$ $L_{om,1} \cong L_{om,2}$ $\Psi_{o,1} \cong \Psi_{o,2}$ $\Psi_{m,1} \cong \Psi_{m,2}$ where
$L_{o,1}$ and $L_{o,2}$ are the values of self-inductance measured in the said two alignment conditions along a first axis ($\varrho$) corresponding to the pole separation axis (N, S) of the armature (A);

$L_{m,1}$ and $L_{m,2}$ are the values of self-inductance measured, in the said two alignment conditions, along a second axis (m) at right angles to the separation axis ($\varrho$) of the pole (N, S) of the inductor (A);

$L_{om,1}$ and $L_{om,2}$ are the values of mutual coupling between magnetomotive forces and fluxes along the said first and second axis ($\varrho$, m) in the said two alignment conditions;

$\Psi_{o,1}$ and $\Psi_{o,2}$ are the values of the flux linked by the windings (W) of the inductor (B) along the said first axis ($\varrho$) in the said two alignment conditions; and $\Psi_{m,i} \cong \Psi_{m,2}$ are the values of the flux linked by the windings (W) of the inductor (B) along the said second axis (m) in the said two alignment conditions.

13. An electric machine according to claim 1, in which the slots (21) of the inductor (B) have an opening in the surface facing the air gap (G) which, along the said direction of relative displacement, has a width close to ¼ or ⅛ of the slot pitch (P).

14. An electric machine according to claim 1, in which the armature (A) comprises at least two axial armature portions which are offset from one another in the said direction of relative displacement.

15. An electric machine according to claim 14, in which the said at least two portions of the armature (A) have respective different transverse sections.

16. An electric machine according to claim 15, in which the said at least two portions of the armature (A) have respective different axial lengths.

17. A machine according to claim 14, in which two portions of the armature (A) are offset from one another by about one quarter of the pitch (P) of the slots (21) of the inductor (B).

18. An electric machine according to claim 14, in which the armature (A) comprises four axial armature portions which, in the said direction of relative displacement are offset from one another by about ⅛ of the slot pitch.

19. An electric machine according to claim 1, dimensioned to deliver in operation a maximum predetermined torque ($T_M$), and in which a first and a second alignment condition is defined for each sample (1–12) of the armature (A) in which the sample extends in a given directional sense from the centre line of the opening (21a) of one slot (21) to the air gap to the centre line of the end (20a) of one tooth (20) at the air gap and, respectively, from the centre line of the end (20a) of one tooth (20) at the air gap to the centre line of the opening (21a) of a slot (21) at the air gap, the armature (A) is formed in such a way that when the machine (M) operates delivering a torque close to the said maximum torque ($T_M$), in each of the said alignment conditions the distribution of induction in the teeth (20) of the inductor (B) has values substantially close to and preferably less than the value of saturation induction of the teeth (20) of the inductor (B) on at least half of the pole pitch of the armature (A), and preferably not more than ¾ of the pole pitch of the inductor (A).

20. A synchronous electric machine according to claim 19, in which, in each of the said alignment conditions, the said distribution of induction is substantially in quadrature with the distribution of the magnetic potential generated by the inductor (B) at the pole shoes (20a) of the teeth (20) of the inductor (B).

21. A synchronous electric machine according to claim 19, in which, in each of the said alignment conditions, the said flux distribution has a variation increasing substantially monotonically over about one pole pitch of the armature (A), and decreasing substantially monotonically for the subsequent or preceding pole pitch.

22. An electric machine according to claim 19, in which each pole of the armature (A), starting from the central body (50), has permanent magnets (60, 62, 63) interposed between all the contiguous bodies except that between the first and the second odd body (51, 52) the said magnets being magnetised in the same sense in each pole, along the axis (m) of symmetry of the poles.

23. An electric machine according to claim 19, in which in each pole of the armature (A), starting from the central body (50), are interposed permanent magnets (60, 62) between the central body (50) and the first odd body (51), and between the second and the third odd body (52, 53); the said permanent magnets being magnetised in the same sense in each pole along the axis (m) of symmetry of the poles.

24. An electric machine according to claim 1, in which each pole (N, S) of the armature (A) is specularly symmetric with respect to an axis (m) orthogonal to the said direction of relative displacement, and in which the distribution of the values (pi) of magnetic permeance at the air gap (G) associated with the armature samples has a local minimum at the or each pole separation axis (o) of the armature poles (N, S), that is the values (pi) of the magnetic permeance at the air gap (G) increase along the air gap (G) in both directions starting from the or each pole separation axis (o) of the armature poles; this magnetic permeance (pi) has its absolute maximum value in correspondence with armature samples lying between the said or each said pole separation axis (o) of the armature poles and the adjacent axis of symmetry (m) of the armature poles.

25. An electric machine according to claim 24, in which n=3 and the armature (A) comprises three bodies (30–32) of ferromagnetic material separated by spaces (33, 34) in which are disposed permanent magnets (35, 36) magnetised parallel to the axis (m) of symmetry of the poles of the armature (A); the armature (A) comprising a central body (30) which at its opposite ends forms two armature samples (1—1) and which has magnetic potential ($\tau_1$) equal to zero, the magnetic permeance ($p_1$) associated with the samples (1—1) formed by the said central body (30) being less than that ($p_2$, $p_3$) associated with the samples (2–3) formed by the other body (31–32), of the armature (A), the permeances ($p_1$, $p_3$) of which are substantially equal to one another.

26. An electric machine according to claim 24, in which n=6 and the armature (A) comprises six essentially chordal bodies or layers (40–42) of ferromagnetic material in pairs of bodies equal to one another separated by spaces (43–45) in which are disposed permanent magnets (46–48) magnetised parallel to the axis (m) of symmetry of the poles of the armature (A); the surface of the armature (A) facing the air gap (G) being divided into four groups of three samples (1–3), the samples (1–3) in each group having respective values of magnetic permeance ($p_1$, $p_2$, $p_3$) at the air gap increasing with the distance from the pole separation axis (o) of the armature poles.

27. A machine according to claim 26, in which the said magnetic permeances $p_1$, $p_2$ and $p_3$ at the air gap of the samples (1–3) of each group are substantially such that.

$$0.76 < \frac{p_1}{p_2} < 1 \quad 0.8 < \frac{p_2}{p_3} < 1 \text{ and } p_1 + p_3 = 2p_2.$$

28. An electric machine according to claim 24, in which n=12 and in which being $p_1$ and $p_2$ the values of the magnetic permeances at the air gap associated with the first two samples (1, 2) of the armature (A) starting from the axis (o) of separation of the poles (N, S) of the armature itself, in both directional senses of relative displacement between inductor (B) and armature (A) are related by: $0.93 < p_1/p_2 < 1$.

29. An electric machine according to claim 28, in which the value $p_3$ of the said magnetic permeance associated with the third samples of the armature (A) starting from the axis (o) of separation of the inductor poles, in both said directional senses is such that substantially $$0.86 < \frac{p_2}{p_3} < 1.$$

30. An electric machine according to claim 28, in which the armature (A) comprises a central body (50; 70; 80) of ferromagnetic material of zero magnetic potential ($\tau$) which has at each end two samples (1—1) contiguous to the or each axis (o) of separation of the armature poles.

31. An electric machine according to claim 28, in which in the said direction of relative displacement the slots (21, 21a) of the inductor (B) have predetermined periodic widths (b', b") different from one another, whilst the teeth (20) have a substantially constant extent; in each slot (21) of the inductor (B) there being located a number of conductors substantially proportional to its width (b'; b").

32. An electric machine according to claim 31, in which the said predetermined width (b', b") of the slots (21) have substantially the ratio 2:√3 one another.

33. An electric machine according to claim 24, in which n=12 and the armature (A) comprises twelve bodies on layers in equal pairs, separated by eleven spaces in which are disposed respective permanent magnets magnetised parallel to the axis (m) of symmetry of the armature poles (A).

34. A machine according to claim 1, in which the armature (A) has asymmetric poles and a central ferromagnetic body of substantially zero magnetic potential which at each of its ends faces the air gap with a plurality of contiguous samples over an overall extent not greater than ⅓ of the armature pole pitch, and in which the total magnetic permeances (pi) associated with the samples of the central ferromagnetic body of the armature (A) have values varying monotonically in dependence on the position co-ordinate along a direction of relative displacement between the inductor (B) and the armature (A).

35. An electric machine according to claim 34, in which n=6 and the armature (A) comprises a central body (90) which at ech of its opposite ends forms two samples (1–6), and a further four bodies or layers (91, 92) in pairs of identical bodies or layers, which at each of their opposite ends form a sample (2, 5; 3, 4); the samples (2, 5; 3, 4) formed by each further body (91, 92) being associated with equal values ($p_2=p_5$; $p_3=p_4$) of the magnetic permeance at the air gap; between the bodies or layers (90–92) of the armature (A) there being defined four spaces (93a, 93b) in which are located respective permanent magnets (94, 95) magnetised orthogonally of the axis (o) of separation of the armature poles.

* * * * *